(12) United States Patent
Burger

(10) Patent No.: US 8,166,099 B1
(45) Date of Patent: Apr. 24, 2012

(54) METHOD AND APPARATUS FOR ASSOCIATING NETWORK ENTITIES

(75) Inventor: Michel C. Burger, Palo Alto, CA (US)

(73) Assignee: Digi International Inc., Minnetonka, MN (US)

( * ) Notice: Subject to any disclaimer, the term of this patent is extended or adjusted under 35 U.S.C. 154(b) by 2886 days.

(21) Appl. No.: 10/409,234

(22) Filed: Apr. 8, 2003

(51) Int. Cl.
*G06F 15/16* (2006.01)
(52) U.S. Cl. ...................................... 709/202
(58) Field of Classification Search .......... 709/223–226, 709/230–232, 201–203; 717/108
See application file for complete search history.

(56) References Cited

U.S. PATENT DOCUMENTS

| | | | | |
|---|---|---|---|---|
| 6,336,119 | B1 * | 1/2002 | Banavar et al. | 1/1 |
| 7,620,737 | B2 * | 11/2009 | Newman et al. | 709/250 |
| 2003/0093769 | A1 * | 5/2003 | Kumar | 717/108 |
| 2003/0101223 | A1 * | 5/2003 | Pace et al. | 709/206 |
| 2003/0172368 | A1 * | 9/2003 | Alumbaugh et al. | 717/106 |

OTHER PUBLICATIONS

Polly Huang Jini for Ubiquitous Devices, Computer Enginnering and Networks Laboratory, Swiss Feredural Instuitute of Technology, Jun. 2002, pp. 1-16.*

* cited by examiner

*Primary Examiner* — Chirag R Patel
(74) *Attorney, Agent, or Firm* — Heimlich Law, PC; Alan Heimlich, Esq.

(57) ABSTRACT

A method and apparatus for associating network entities, such as devices and services have been disclosed. By utilizing context operational modifiers, such as context rules, context definitions, and context services, entities may be associated.

18 Claims, 47 Drawing Sheets

METHOD AND APPARATUS FOR ASSOCIATING NETWORK ENTITIES

FIELD OF THE INVENTION

The invention pertains to entities connected to a network. More particularly, the invention relates to a method and apparatus for associating network entities.

BACKGROUND OF THE INVENTION

Associating a networked entity, such as a device, with either an application and/or a controlling function may increase the capability of the networked device. Additionally networking a device to a network may lower costs and/or allow for more flexibility. For example, a vending machine may operate as a standalone device having the electronics and equipment necessary for accepting change, reading and identifying currency bills, dispensing, etc. However, by connecting the vending machine to a network and associating it to another networked entity, such as an application for controlling the machine, may allow for production of a lower cost machine. For example, a networked machine may only need a bill reader that sends the data to an application to verify if the bill is acceptable. Using the network would allow the machine to have less electronics as the computation for bill validation may now be done at a centralized place rather than being done in every machine. Additionally, network control allows for more flexibility. For example, when the face on the dollar bill changed, each independent machine bill changer had to be reprogrammed locally. If the machine was networked for this function, then a single change at the network level was available to every such networked machine. Additional functions may also be added to machines. For example, in an airport where various currencies may be in use, a networked machine would be able to identify the currency, calculate the exchange rate, prompt the user as to purchase status, and even display instructions in other languages, etc.

Thus, networked devices have a variety of potential advantages. However, the association of a device with an application and/or controlling function may present a challenge. If the device is hardwired into an interface this is inflexible. If the device is dedicated to an application this may also be inflexible. If the device may only access a single resource then availability may be downgraded if the resource is off-line. This presents a problem.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and apparatus for associating network devices are described.

The invention by providing for associating network devices, allows for greater flexibility in associating network devices to other resources.

In the explanation below various terminology is used. These are understood by those of ordinary skill in the art. For the benefit of the reader the following should be noted. To provide a concise illustration of the invention the context of the description will often refer to connecting machines or devices to a network or the Internet. One of ordinary skill in the art will appreciate that the Internet is but one example of a network and that the invention may be practiced with other networks.

Figure 3:
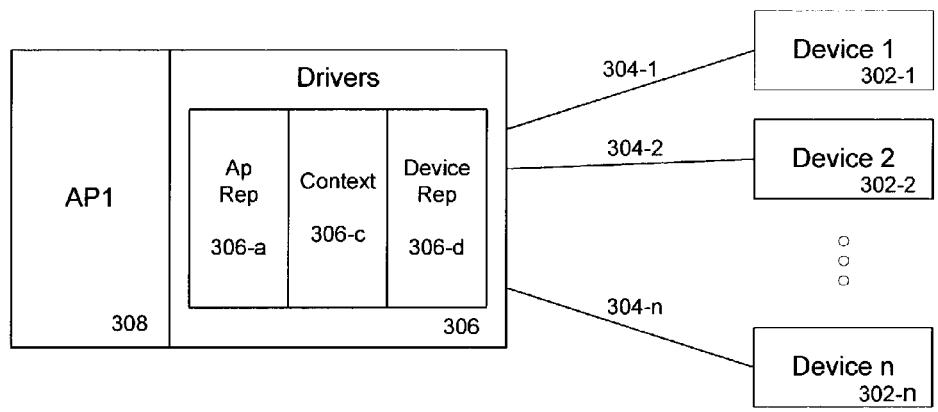
FIGS. 3, 4, 5, and 6 illustrate approaches to associations.

FIG. 3 illustrates an approach to associating devices with, for example, a resource. Here a series of devices Device 1, 2, to Device n (302-1, 302-2, to 302-$n$ respectively) are coupled (via links 304-1, 304-2, to 304-$n$ respectively) to Drivers 306 which is coupled to an application AP1 308. The Drivers 306 may be the same or different to interface with the devices (Device 1 to n). The application AP1 308 then handles the devices (302-1 to 302-$n$). In this approach the Drivers 306 has three components, a representative for the devices (1 to n) 306-$d$, a context 306-$c$, and a representative for the application (AP1) 306-$a$. This approach, may handle a variety of devices (1 to n), however, it handles only a single application (308).

Figure 4:
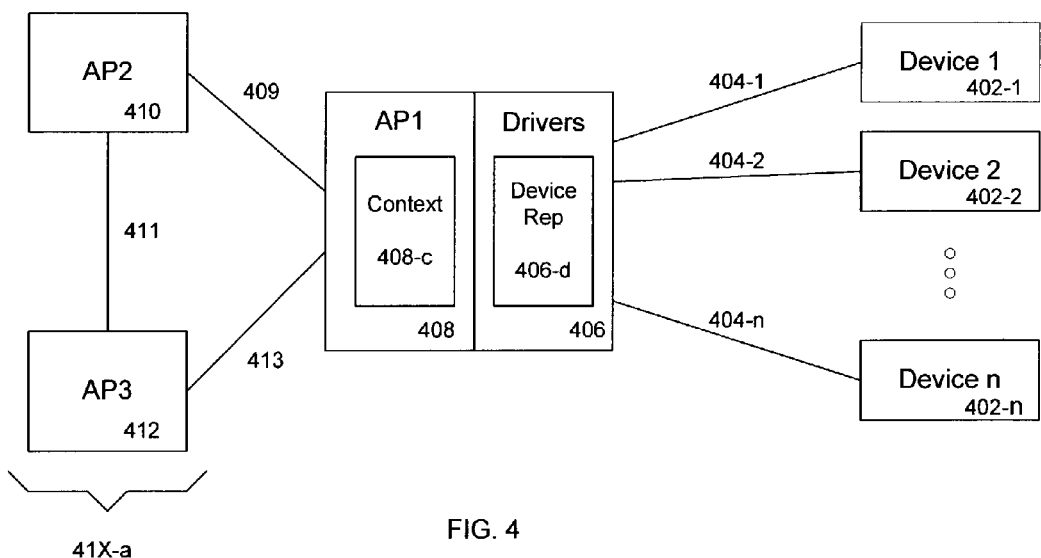

FIG. 4 illustrates another approach to associating devices with a resource. A series of devices, Device 1, 2, to Device n (402-1, 402-2, to 402-$n$ respectively) are coupled (via links 404-1, 404-2, to 404-$n$ respectively) to Drivers 406 which is coupled to an application AP1 408. The Drivers 406 may be the same or different to interface with the devices (Device 1 to n). The application AP1 408 then handles the devices (402-1 to 402-$n$). In this approach, Drivers 406 has representations of the devices (1 to n) at 406-$d$, AP1 408 has a context 408-$c$, and AP2 and AP3 have an application representation 41X-$a$. From an application standpoint, to add a new application capability does not require that AP1 408 be modified. A second application AP2 410 which may provide additional capability may link to AP1 408 via registering with the context 408-$c$, shown here figuratively as link 409. Alternatively, this may be extended, wherein AP2 410 may link via 411 to AP3 412. Thus one application may access others if it is not capable of handling the requests from a device. Alternatively, AP3 412 may communicate directly with the original application interface (AP1 408) by registering with the context 408-$c$, shown via link 413. In this way communicated results need not pass back through the invoking application. For example, an AP3 412 result, may communicate directly with AP1 408 via link 413, rather than pass back through link 411 to AP2 410 and then through 409 to AP1 408. The 411 link (and associated applications) illustrates an approach that may be used in such applications as Enterprise Application Integration (EAI), Business-to-Business Integration (B2BI), Electronic Data Interchange Implementation (EDI), etc.

An alternative embodiment of FIGS. 3 and 4 described above is where the respective direct links from the drivers to the devices (304-1 to 304-*n*, 404-1 to 404-*n*) now go through a network.

Figure 5:
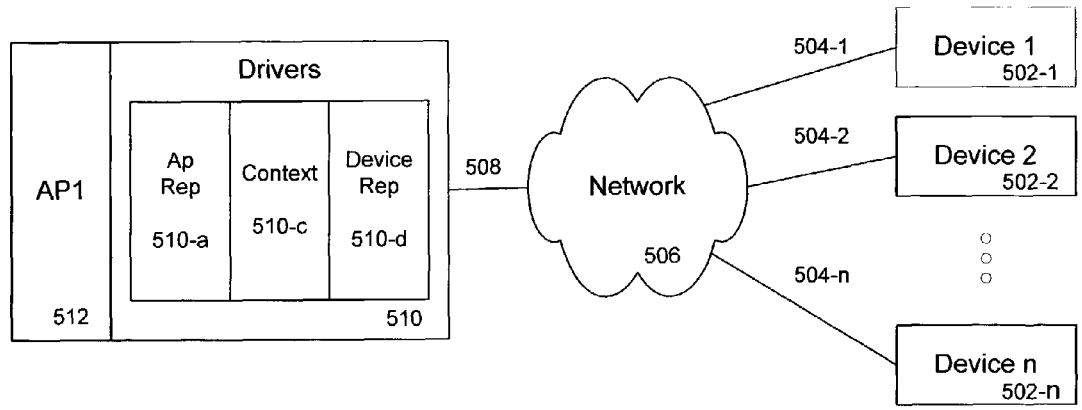

In FIG. 5, Device 1 502-1, Device 2 502-2, to Device n 502-*n* are coupled via links 504-1, 504-2, to 504-*n* respectively to a Network 506. Network 506 is coupled via link 508 to Drivers 510, which is coupled to AP1 512. Here there is a device representation 510-*d*, a context 510-*c*, and an application or services representation 510-*a*.

Figure 6:
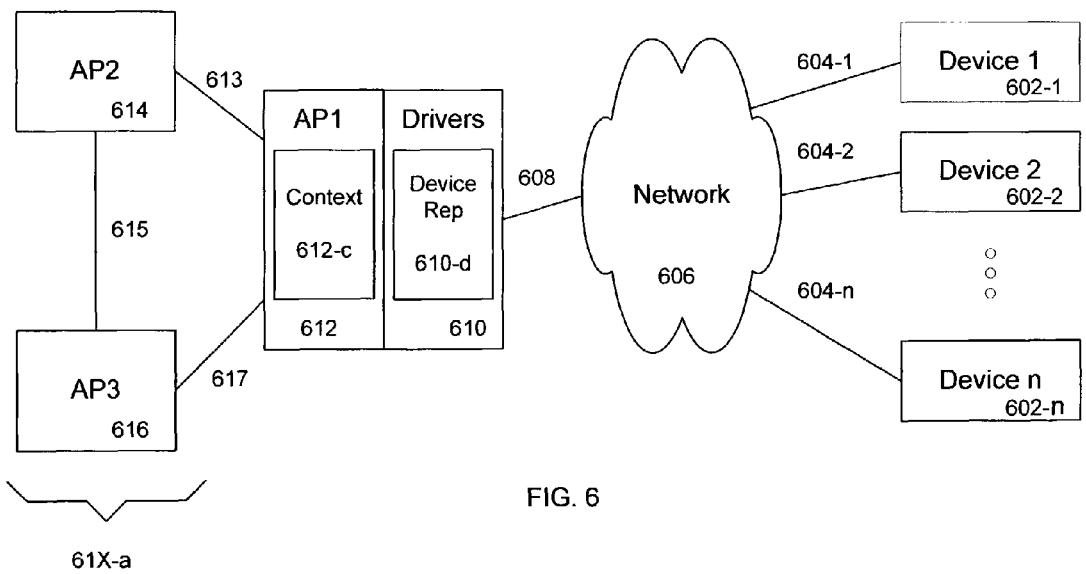

In FIG. 6, Device 1 602-1, Device 2 602-2, to Device n 602-*n* are coupled via links 604-1, 604-2, to 604-*n* respectively to a Network 606. Network 606 is coupled via link 608 to Drivers 610 which is coupled to AP1 612. AP1 612 is coupled via link 613 to AP2 614. AP2 614 is coupled via link 615 to AP3 616. AP3 616 is coupled via link 617 to AP1 612. Again, there is a device representation 610-*d*, a context 612-*c*, and a services representation 61X-*a*.

Figure 7:
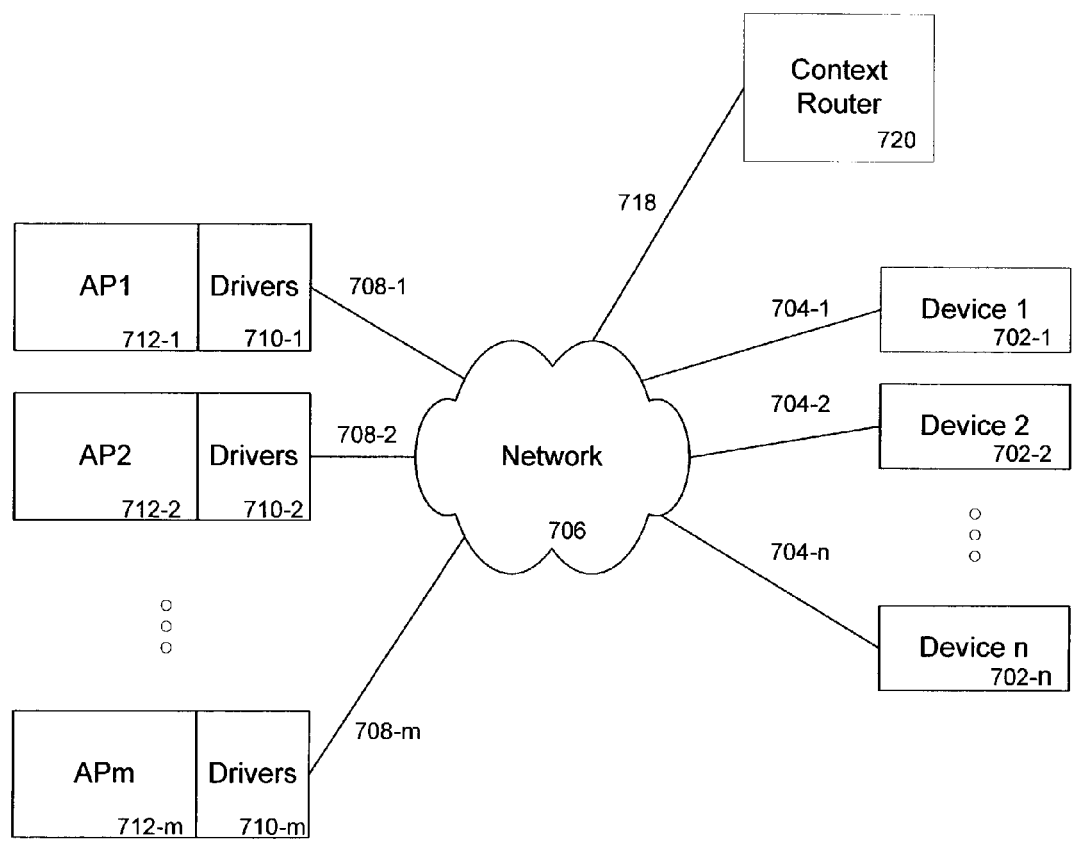
FIG. 7 illustrates one embodiment of the invention.

FIG. 7 illustrates another embodiment of the invention. Device 1 702-1, Device 2 702-2, to Device n 702-*n* are coupled via links 704-1, 704-2, to 704-*n* respectively to a Network 706. Network 706 is coupled via links 708-1, 708-2, to 708-*m* to Drivers 710-1, Drivers 710-2, to Drivers 710-*m* which are coupled to applications AP1 712-1, AP2 712-2, to APm 712-*m* respectively. Context router 720 is coupled via link 718 to the Network 706. Here any and/or all of n devices may be associated with any and/or all of m applications. One of skill in the art will appreciate that this embodiment allows for great flexibility in adding devices as well as applications because they are decoupled and independent of each other.

For example, if a new device is added it will register with the context router 720 and may then have access to applications. Likewise when a device is removed, the context router may no longer keep open communications with the removed device. A new application will register with the context router, and then it may be used by devices. An application going offline will no longer provide services. What is to be appreciated is that the n-devices to m-services communication is effected through the context router. One embodiment of the invention accomplishes this through the use of emitters, receivers, observers, context rules, context definitions, and context services as is described in more detail below.

For illustrative purposes, the context router 720 and its connection 718 are shown as separate from the Network 706. One of skill in the art will appreciate that in alternative embodiments the context router may be part of a network, such as a network server, a router, etc. The function of the context router 720 may also be performed by an application running on a machine, for example on a server, a client, a combination of these.

Figure 8:
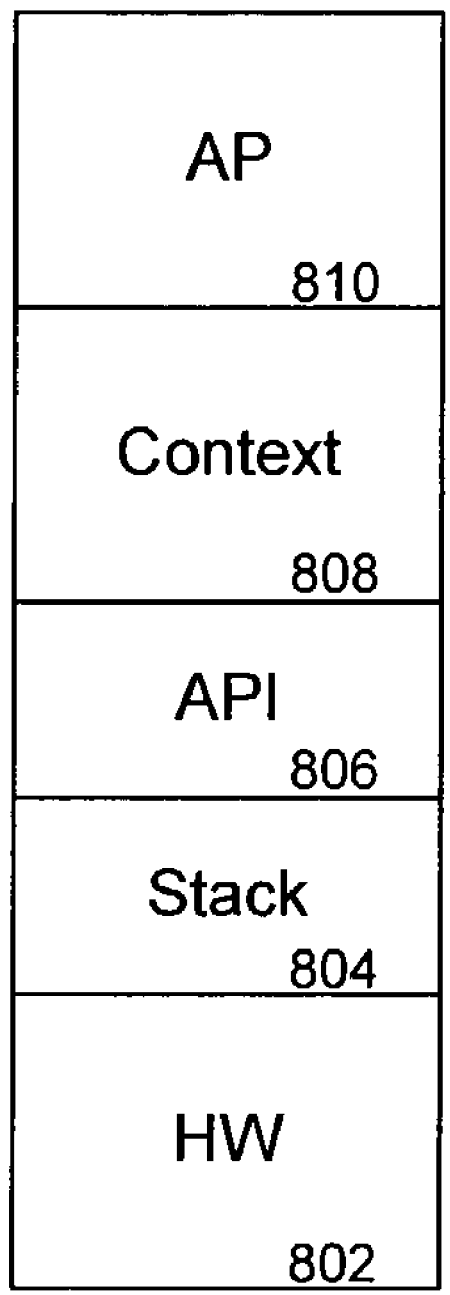
FIG. 8 illustrates one embodiment of a stack of the invention.

FIG. 8 illustrates another viewpoint of an embodiment of the invention. Here, hardware HW 802 is coupled to a Stack 806 which is coupled to an application programming interface API 806 which is coupled to a Context 808 which is coupled to an application AP 810. From this embodiment viewpoint a device is seen running an application. Thus, the device does not view the application as a separate entity. The device and the application in this embodiment have been associated.

For example, the hardware 802, stack 804, and API 806 may be viewed as a device. The AP 810 application may be viewed as a service. The content 808 is what associates the device with the service, and vice versa.

Figure 9:
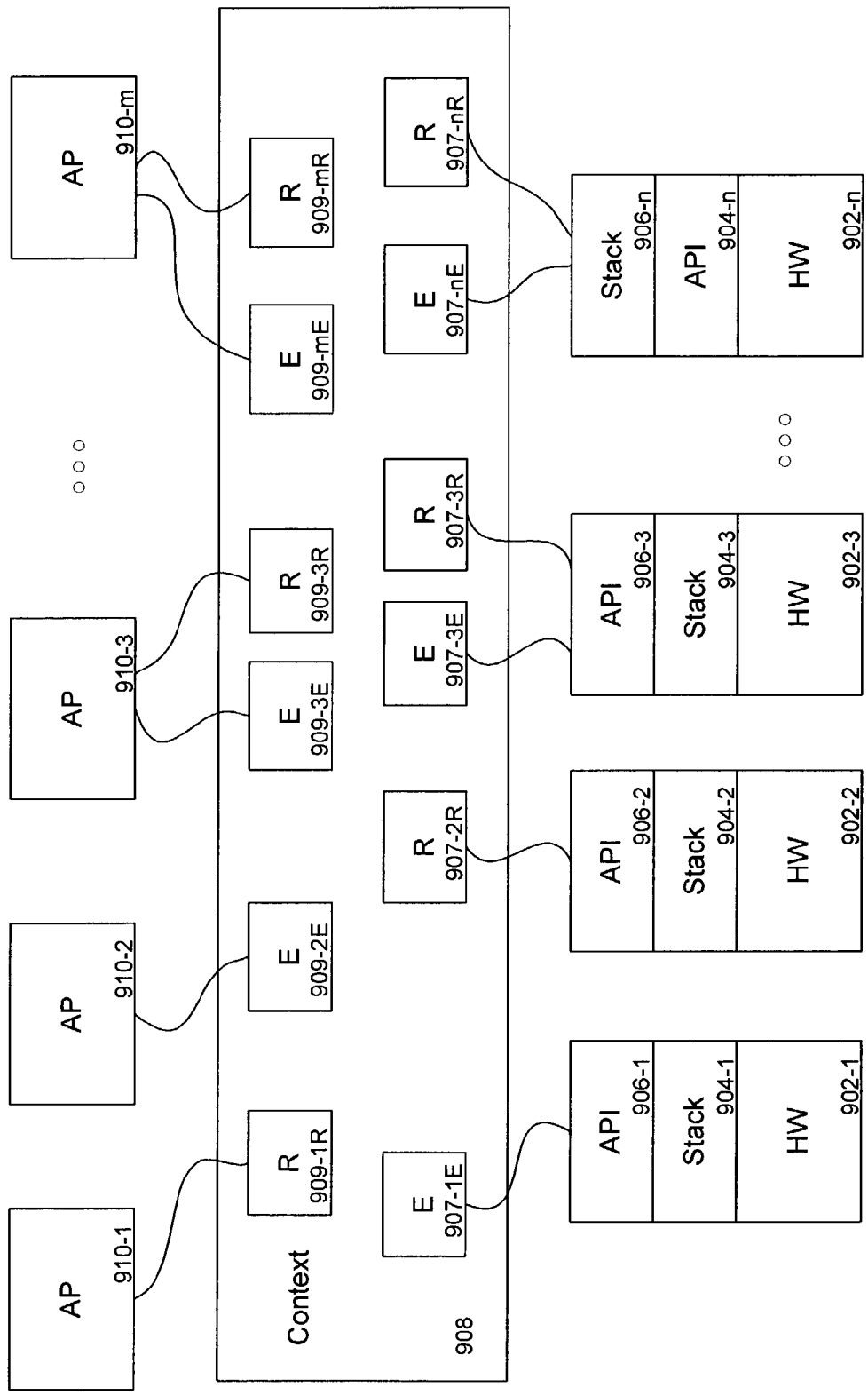
FIG. 9 illustrates one embodiment of the invention in a context.

FIG. 9 illustrates one embodiment of the invention. Here n devices are associated through a Context 908 to any of m applications. Device 1 (HW 902-1, Stack 904-1, and API 906-1), Device 2 (HW 902-2, Stack 904-2, and API 906-2), Device 3 (HW 902-3, Stack 904-3, and API 906-3), to Device n (HW 902-*n*, Stack 904-*n*, and API 906-*n*) are coupled to event emitters (E) and Receivers (R), 907-1E (E), 907-2R (R), 907-3E (E) and 907-3R (R), and to 907-*n*E (E) and 907-*n*R (R) respectively. Event receivers (R) 909-1R, 909-3R, and 909-*m*R are coupled to applications AP 910-1, 910-3, and 910-*m* respectively. Event emitters (E) 909-2E, 909-3E, and 909-*m*E are coupled to applications AP 910-2, AP 910-3, and AP 910-*m* respectively.

For illustrative purposes a combination of emitters and receivers are shown in FIG. 9 to illustrate how a context may be communicated from a device to an application. What is to be noted is that services or applications as well as devices may have one or more emitters and/or receivers. Additionally the emitter(s) and receiver(s) may be combined in a transceiver for bi-directional communication between an application and a device, thus a transceiver would be associated with an application and a device. What is to be appreciated is that communications between devices (902) and services (910) are done through the context (908). There is not a direct communication between the devices and the services. It is important to understand that the representation of devices and applications within the context are potentially at the same time emitters and receivers. That is, devices and applications may have entries into the context for emitting events and an observer of the context for receiving events. It is not mandatory for a device or an application to be at the same time a receiver and emitter.

In FIG. 9 a device or service may have an emitter which "sends" out or emits an event. Now the receivers R associated with an application or device may or may not choose to "receive" the emitted event via the context. If a receiver (or more than one receiver) decides to receive the emitted event then there is, via the Context 908, an association between the device and the application(s). Thus any event emitted is emitted to the context and any event received always come form the context, therefore everything is done via the context as was earlier noted.

The emitted event has an identifier (ID) which may be sensed by the receiver. The ID may be associated with a particular device, a group of devices, a class of devices, an application, a group of applications or services, etc.

Figure 10:
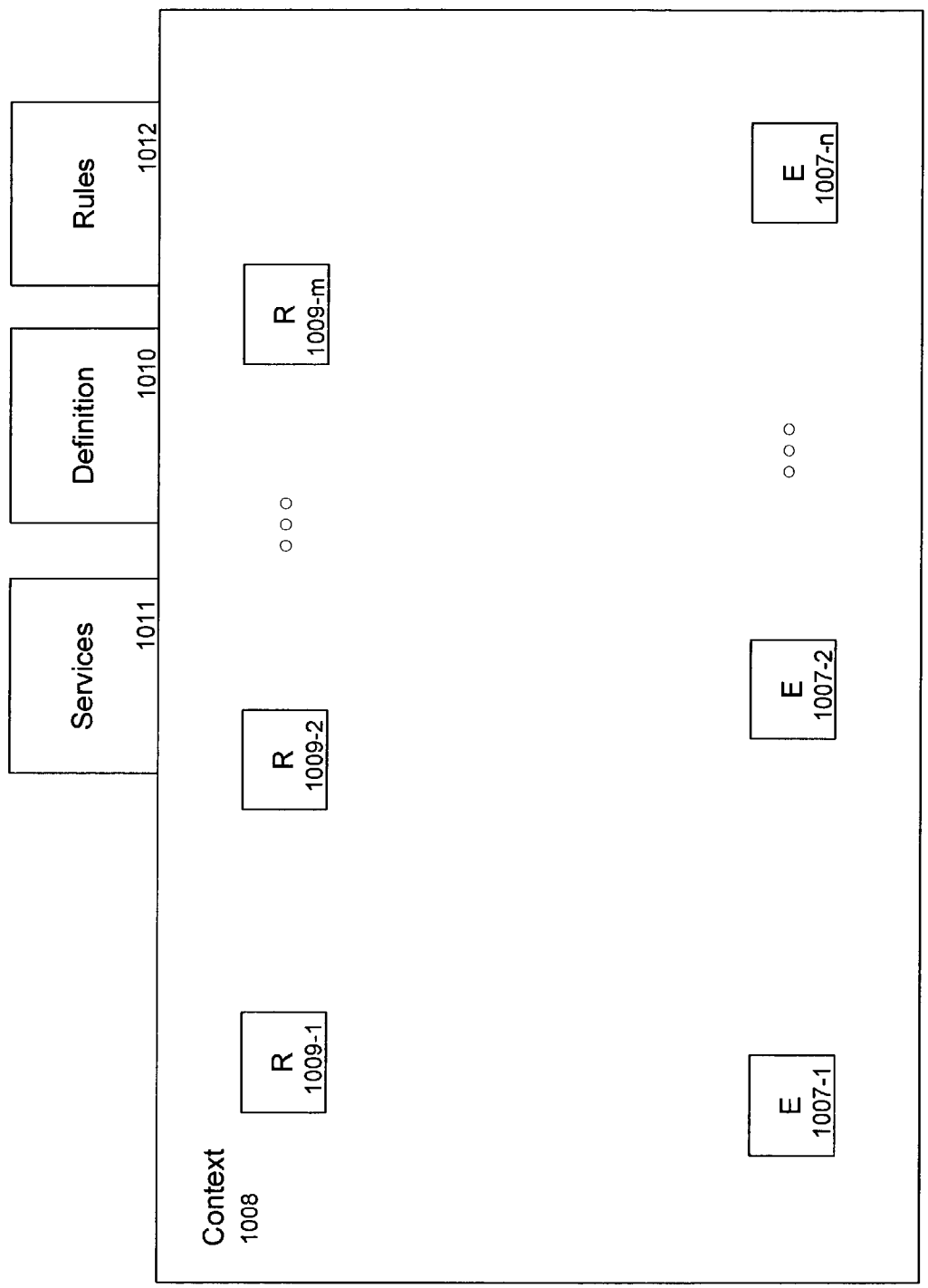
FIG. 10 illustrates one embodiment of the invention in a context with definitions rules, and services.

FIG. 10 illustrates another embodiment of the invention. Here, the Context 1008 has the emitters (E) 1007-1, 1007-2, to 1007-*n* and the receivers (R) 1009-1, 1009-2, to 1009-*m*. Additionally there is a Definition 1010, Rules 1012, and Services 1011.

The Definition 1010, in one embodiment of the invention, may define the nature of the context. For example, the Definition 1010 may be static or dynamic varying with, for example, time of day. Thus, the nature of the context may be static or dynamic. The Rules 1012, in one embodiment, may define how to handle events. Services 1011, in one embodiment, may define the characteristic of the context itself.

FIGS. 11A-11D illustrate one embodiment of an add entry scenario of the invention. The addEntry commands can come from many sources, such as the Context definition, the application side, etc. The context definition can be rules that will look for entry (mostly device type) to be added in the context.

Via some look up server, the Context Definition will identify the device to be added into the context and once identified will add the corresponding entry.

The application can set up a list of device(s) to be added in the context and therefore will invoke the command to add the corresponding entries into the context.

By definition being an entry into a context, implies that a context observer associated with the entry is added to the list of observer. However, it is possible to only add an observer without having an entry into the context. Another variation is to register the events to be sent by the entry.

The context may have a static event table or a dynamic event table. Depending on some context definition the context may not accept any new event to be received or sent by the entry. In the case of a dynamic table, each time a new event signature is proposed by an entry, the table is modified to add the new event signature to the table.

Figure 11A:
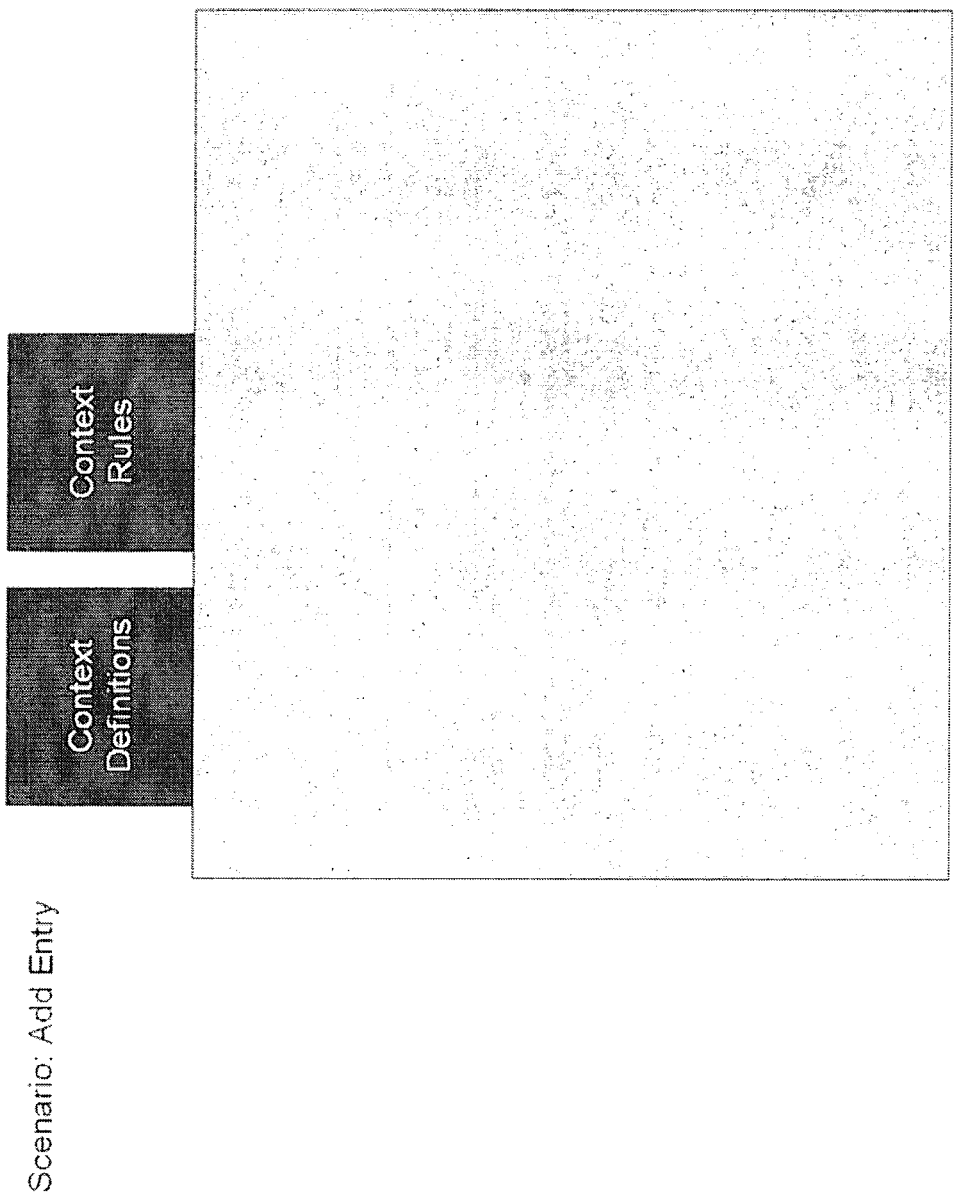
FIGS. 11A-11D illustrate one embodiment of an add entry scenario of the invention.
Figure 11B:
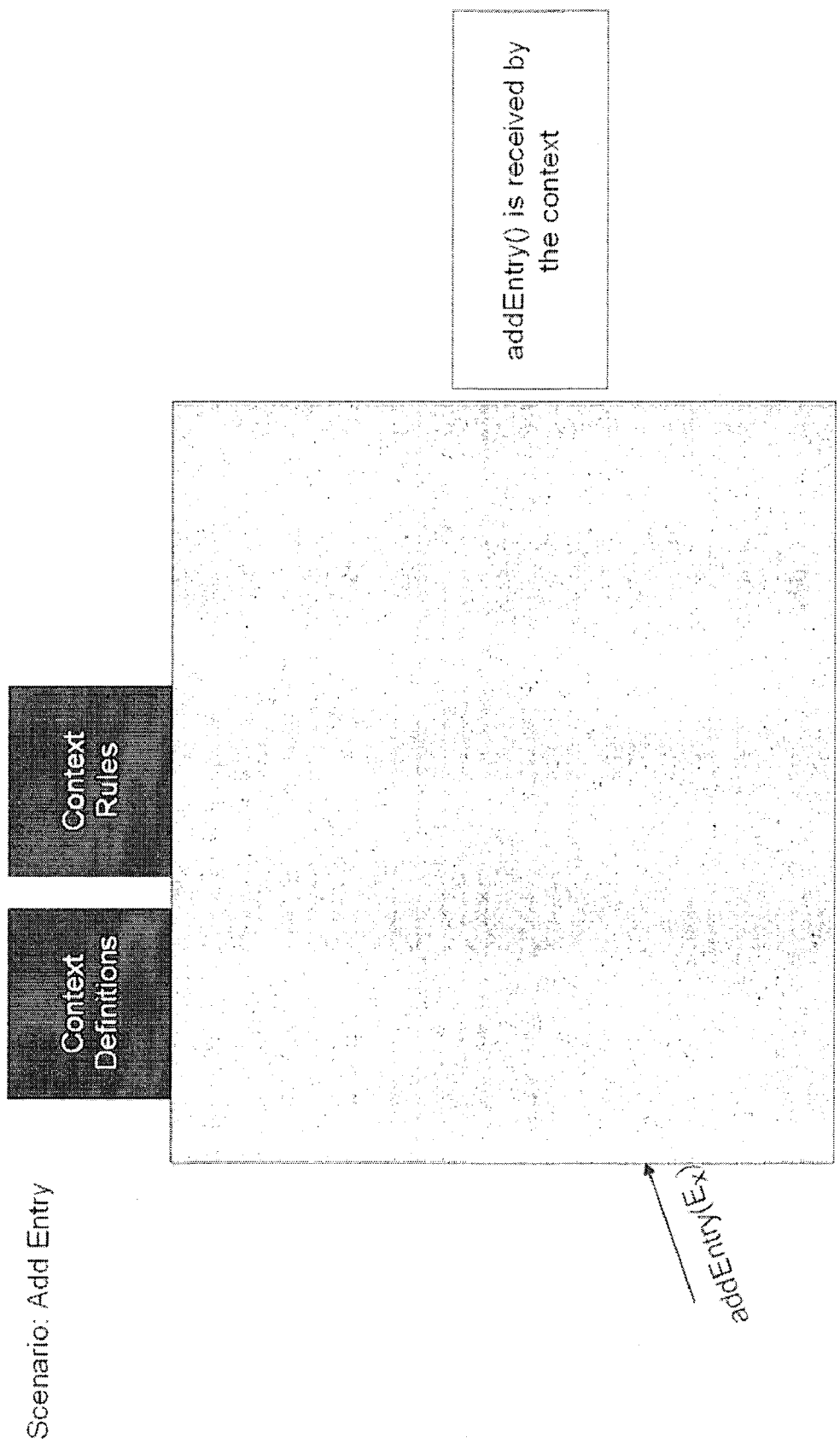
Figure 11C:
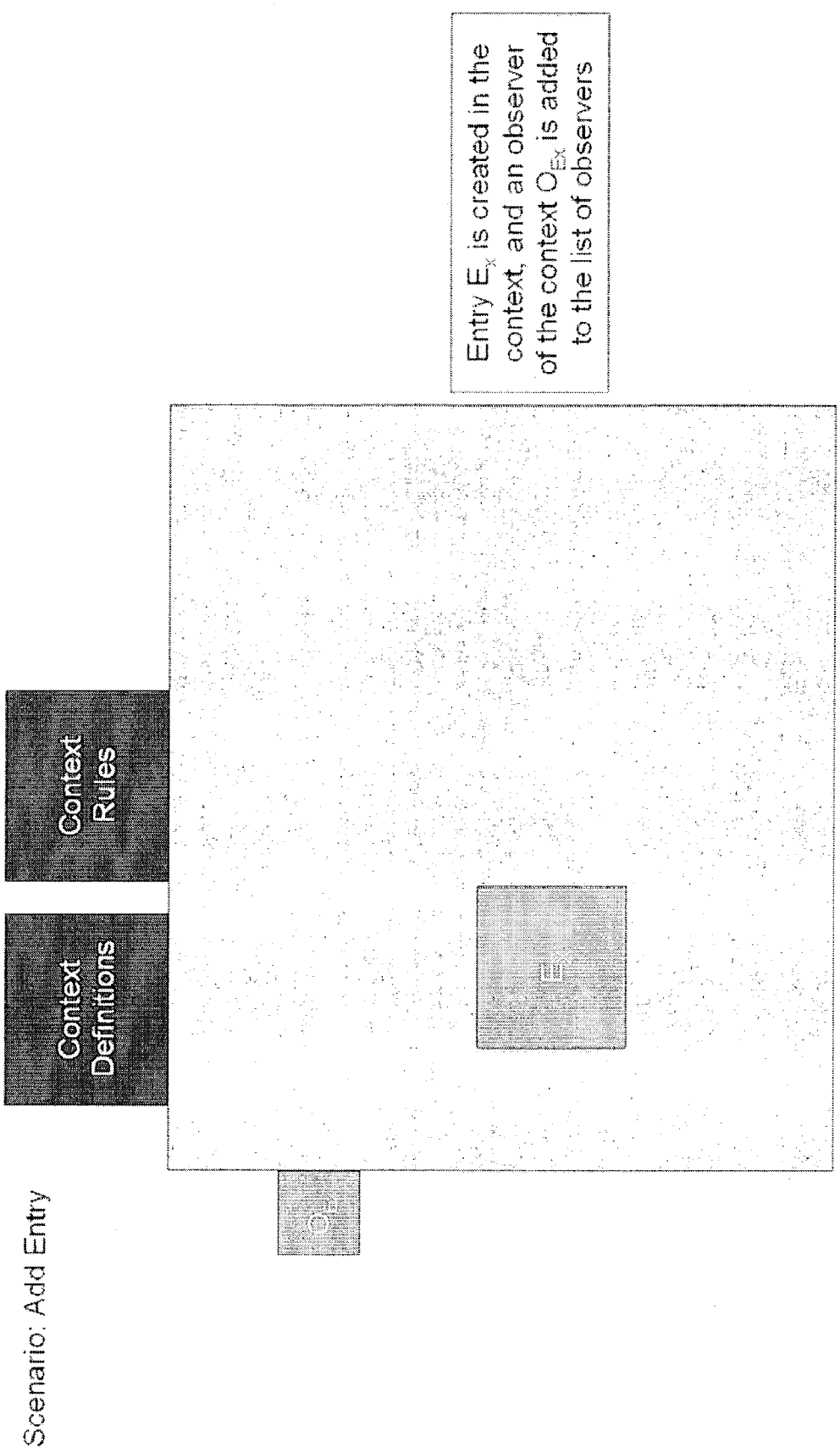
Figure 11D:
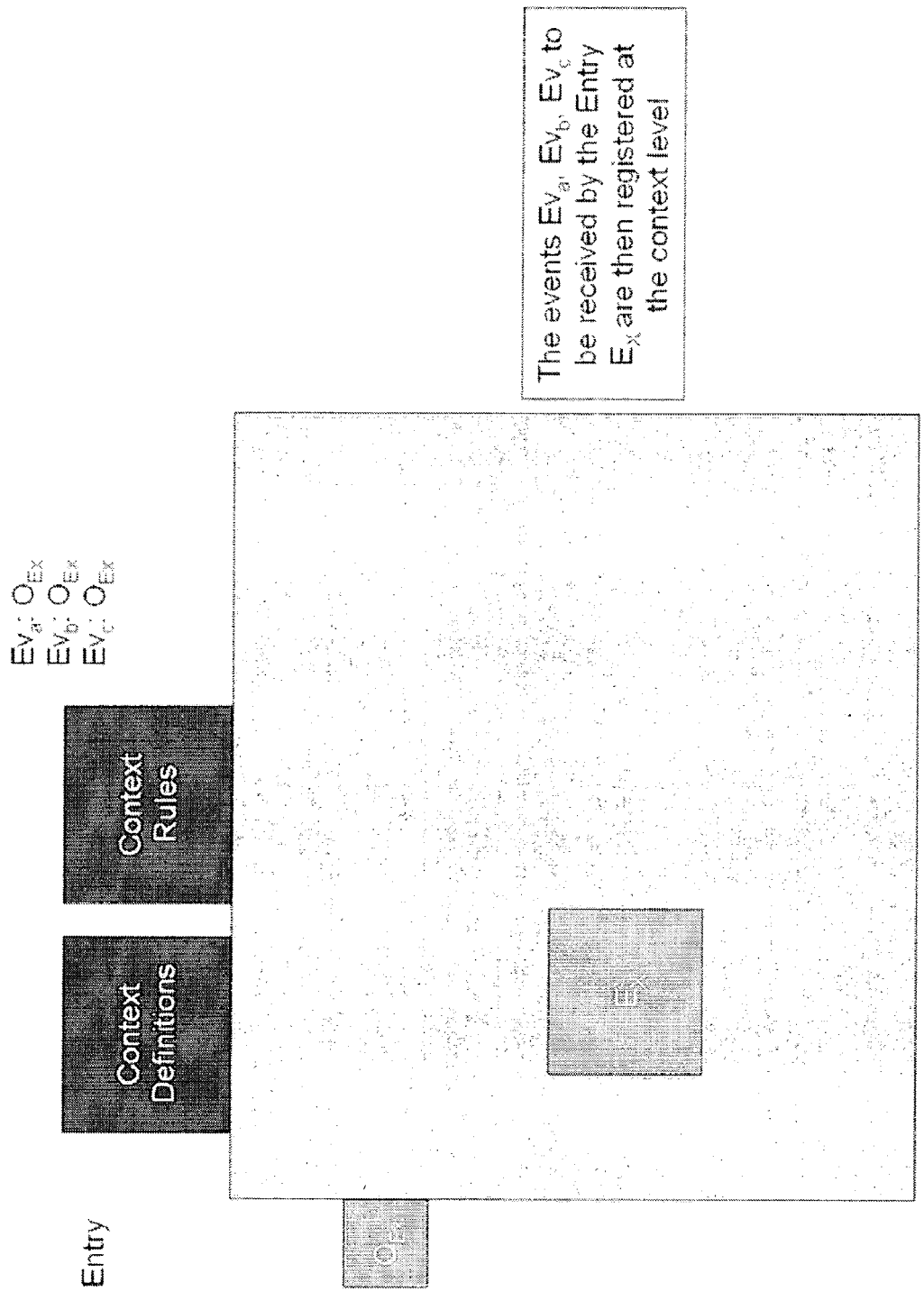

FIG. 11A shows the initial state of the embodiment of the invention for the add entry scenario before anything has occurred. FIG. 11B shows the addEntry(Ex) being received by the context. In FIG. 11C, in response to this addEntry(Ex) being received the entry Ex is created in the context, and an observer of the context OEx is added to the list of observers. In FIG. 11D the events Eva, Evb, and Evc to be received by the Entry Ex are then registered at the context level.

Figure 12A:
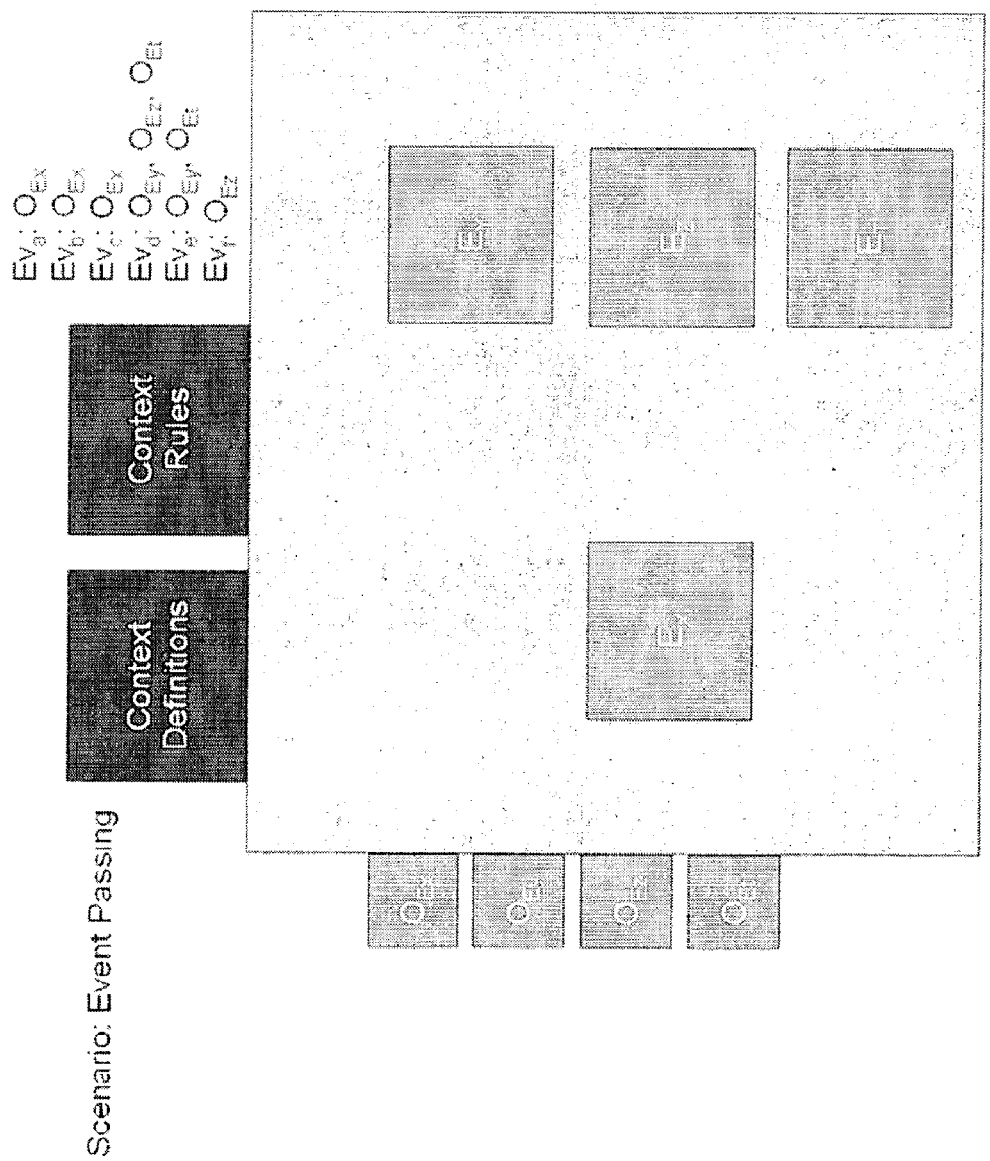
FIGS. 12A-12C illustrate one embodiment of an event passing scenario of the invention.
Figure 12B:
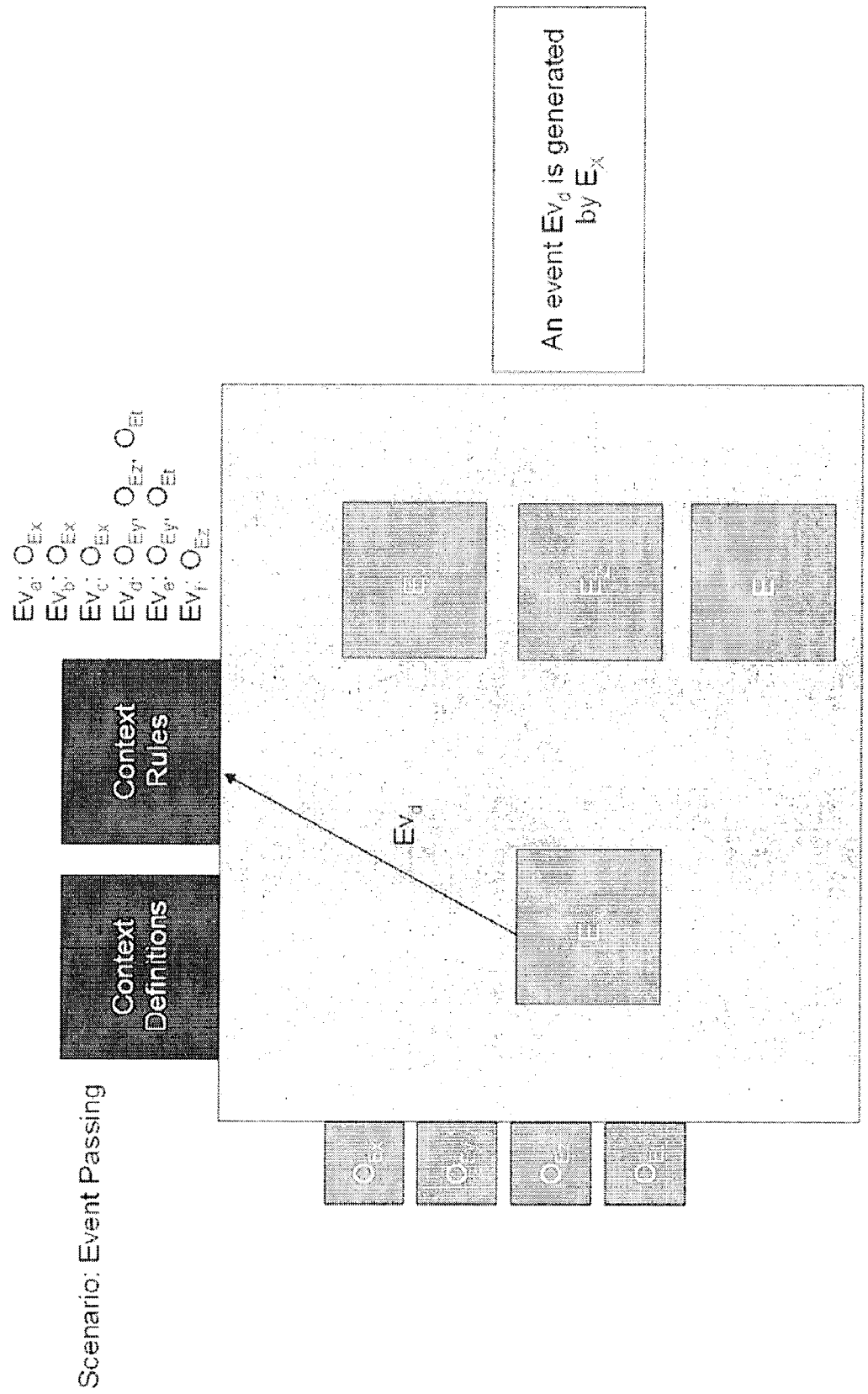
Figure 12C:
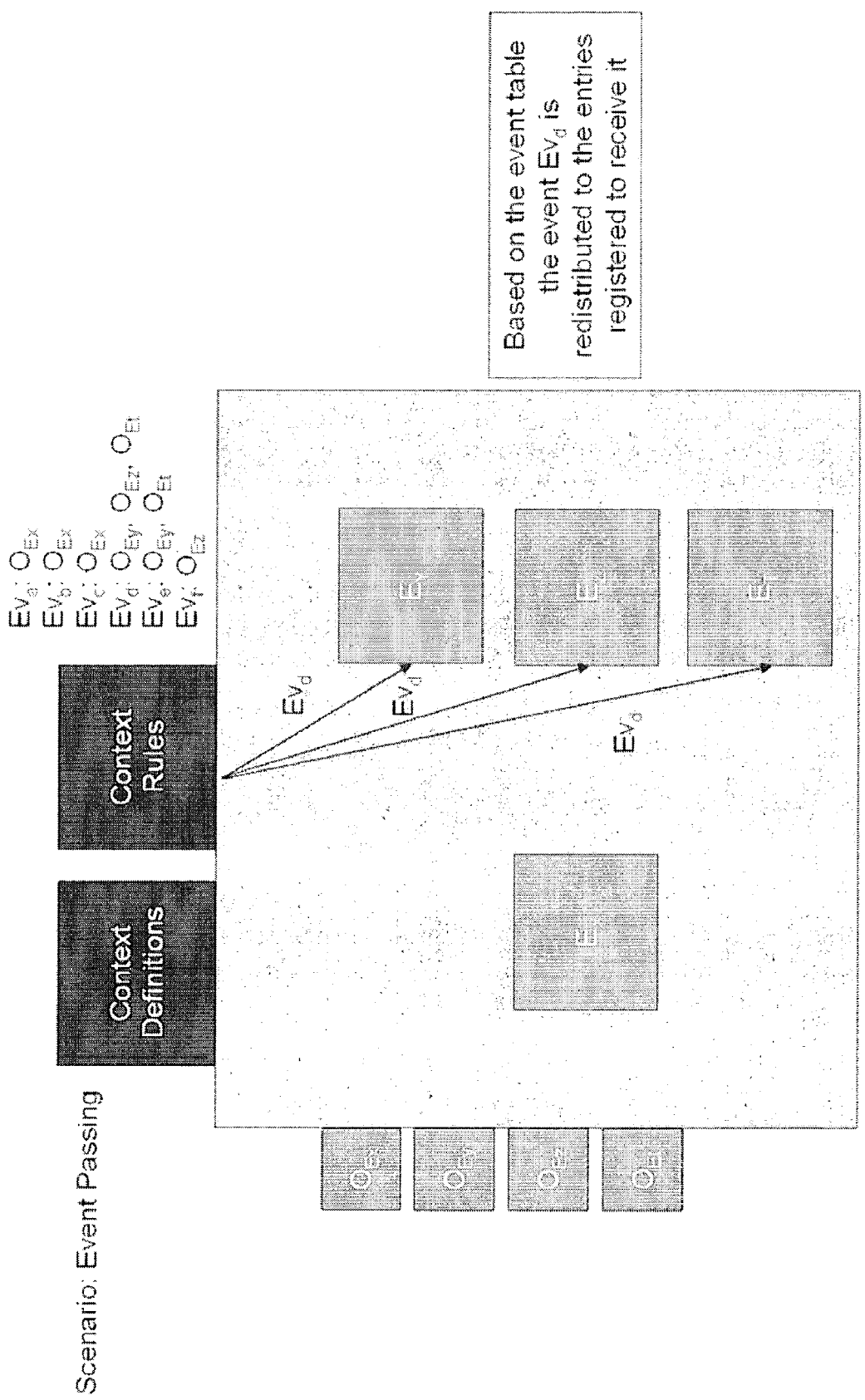

FIGS. 12A-12C illustrate one embodiment of an event passing scenario of the invention. FIG. 12A shows an initial state of the system. In FIG. 12B an event Evd is generated by Ex. In FIG. 12C, based on the event table the event Evd is redistributed to the entries registered to receive it.

Figure 13A:
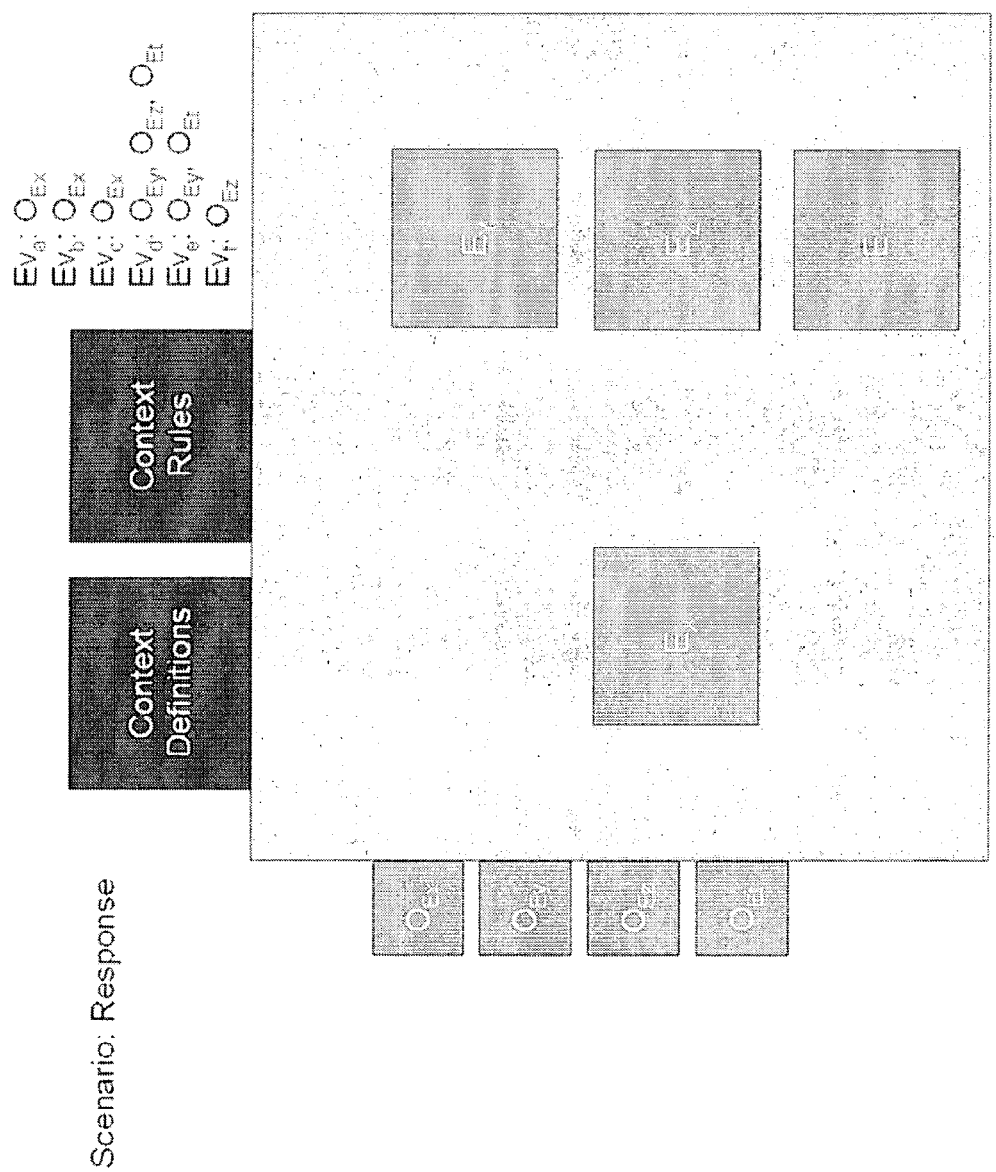
FIGS. 13A-13F illustrate one embodiment of a response scenario of the invention.
Figure 13B:
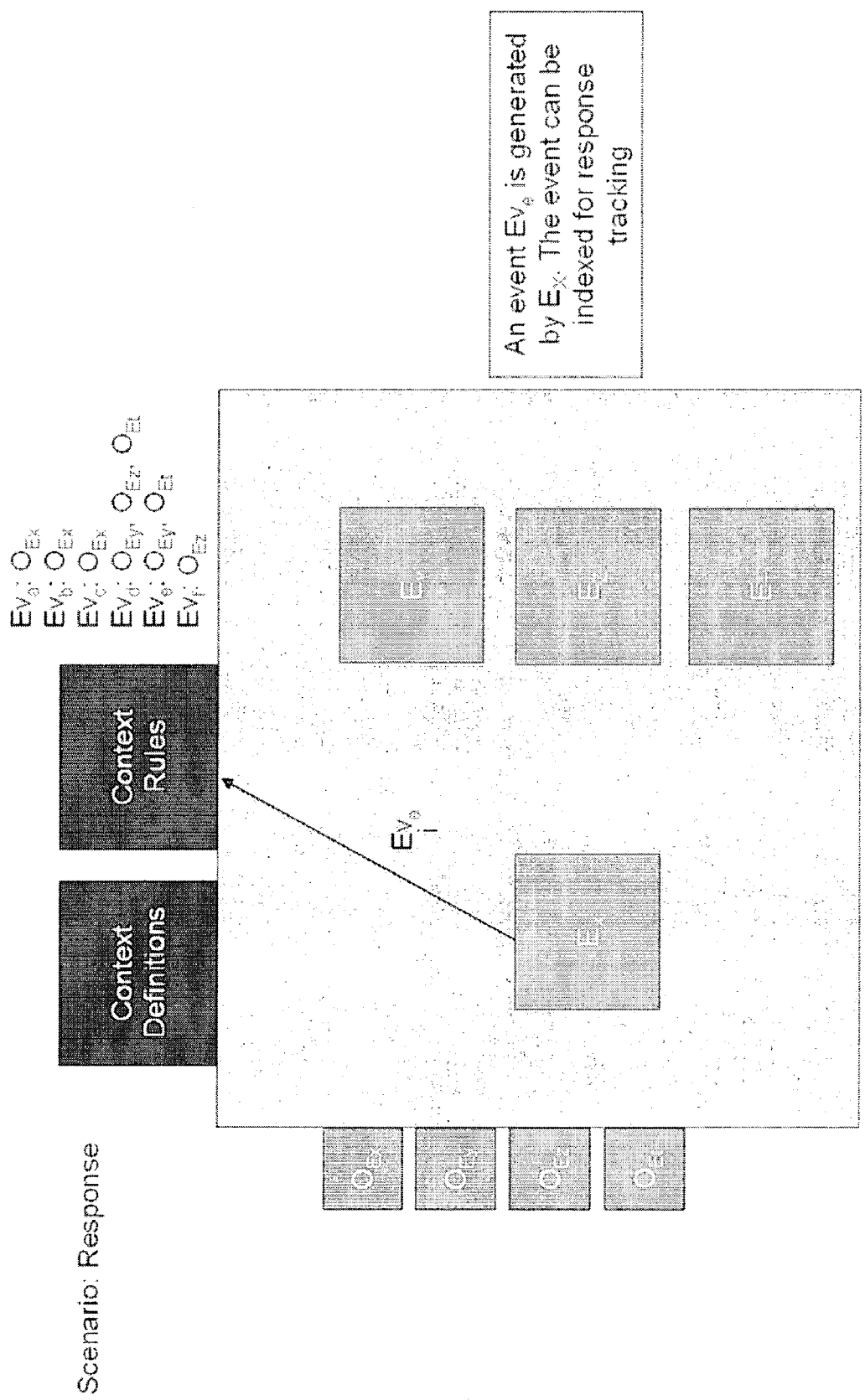
Figure 13C:
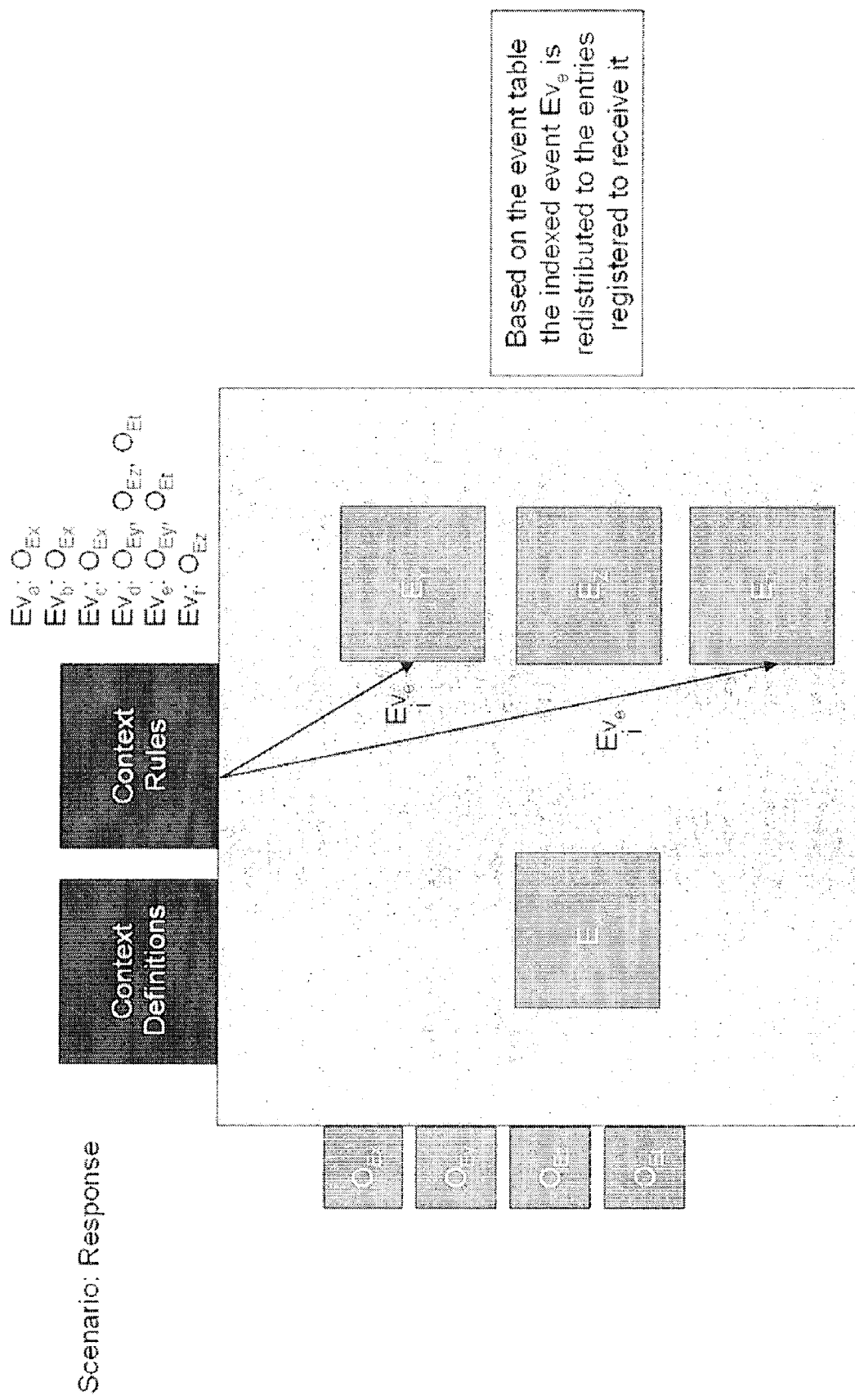
Figure 13D:
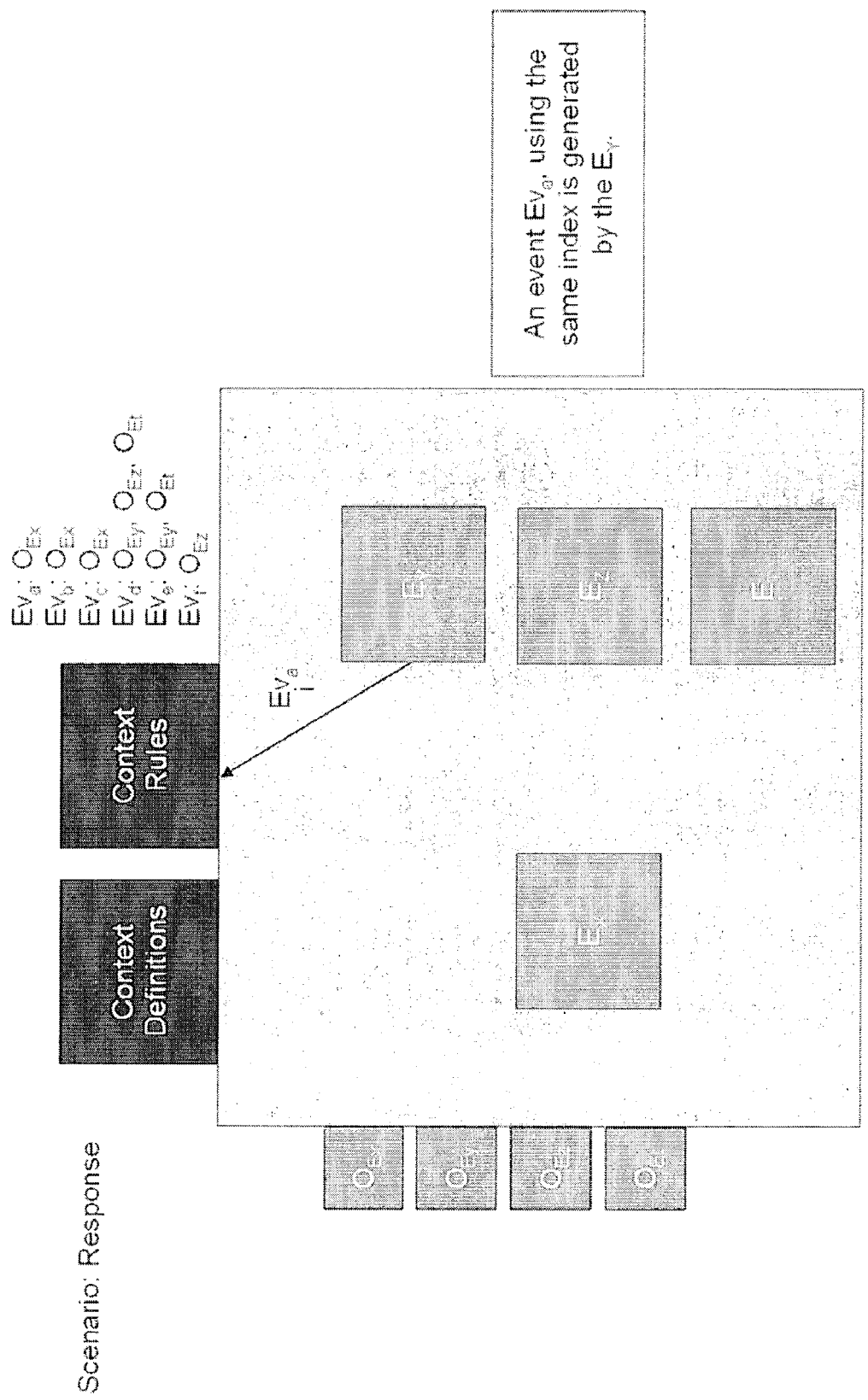
Figure 13E:
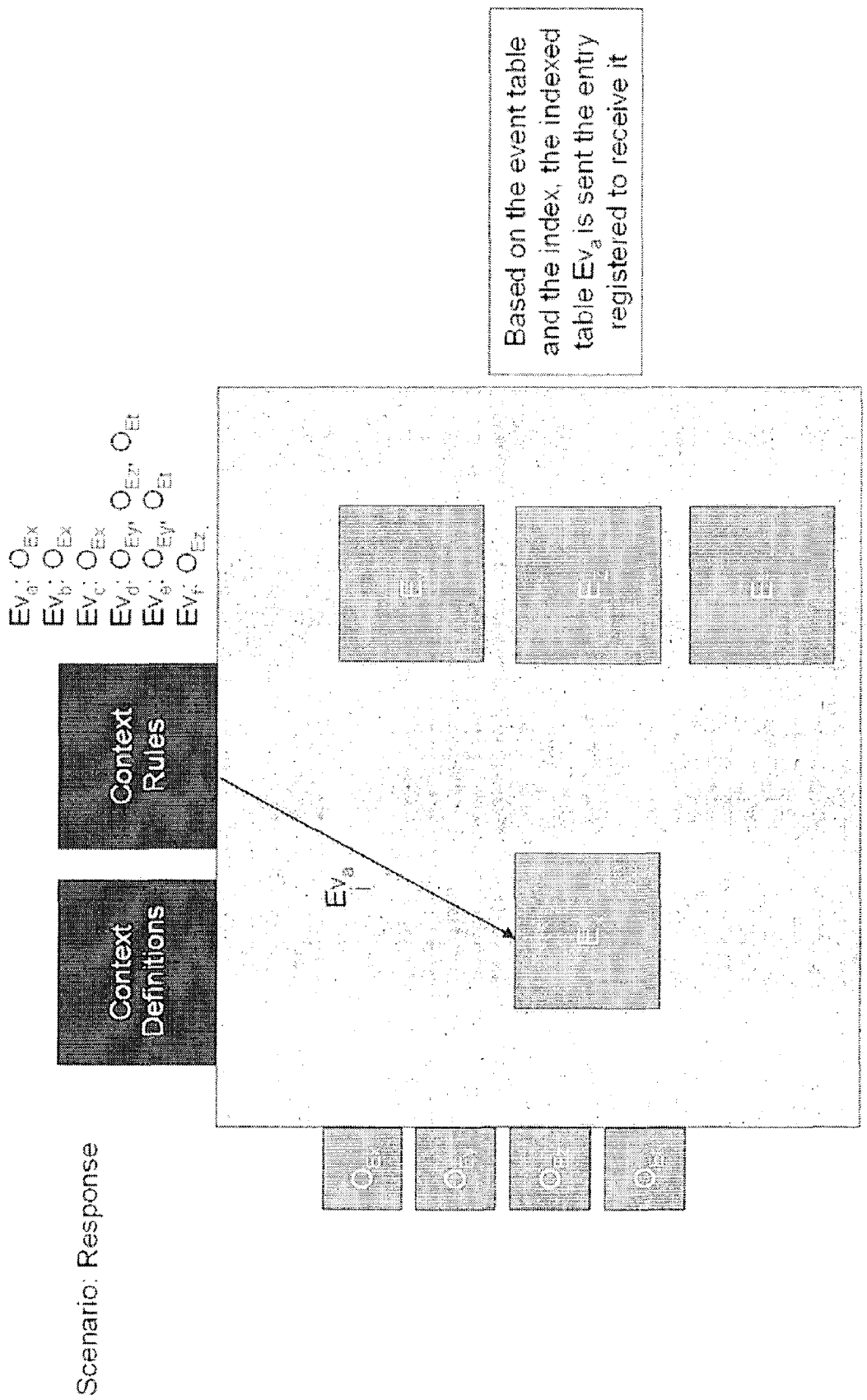
Figure 13F:
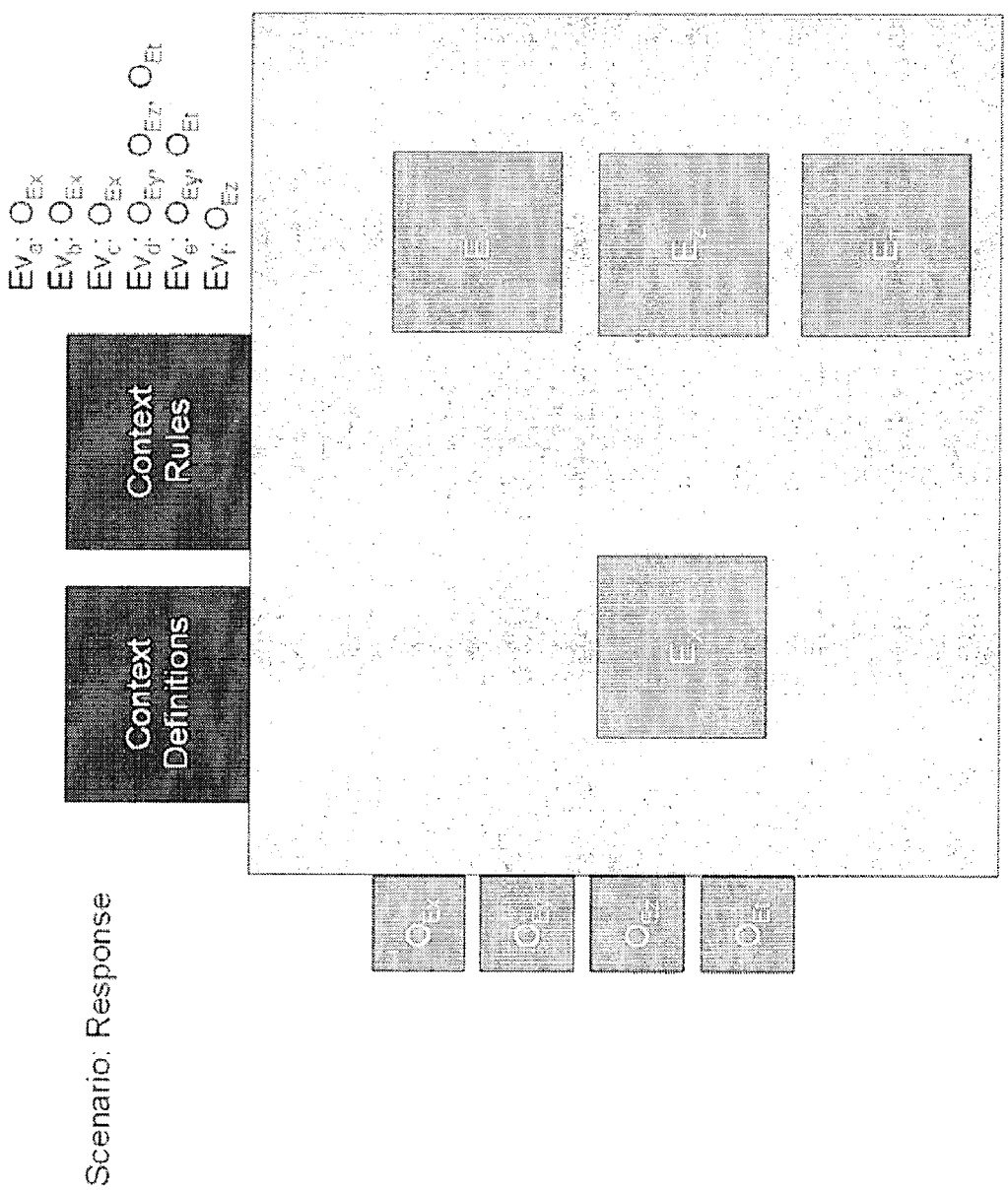

FIGS. 13A-13F illustrate one embodiment of a response scenario of the invention. FIG. 13A shows an initial state of the system. In FIG. 13B an event Eve i (i denotes an index) is generated by Ex. The event can be indexed for response tracking. In FIG. 13C, based on the event table, the indexed event Eve (denoted Eve i) is redistributed to the entries registered to receive it. In FIG. 13D, an event Eva using the same index (Eva i) is generated by Ey. In FIG. 13E, based on the event table and the index, the indexed table Eva is sent the entry registered to receive it (Ex). In FIG. 13F, thus the entry Ex or the component it represents can then correlate Eva to be the response of Eve.

Figure 14A:
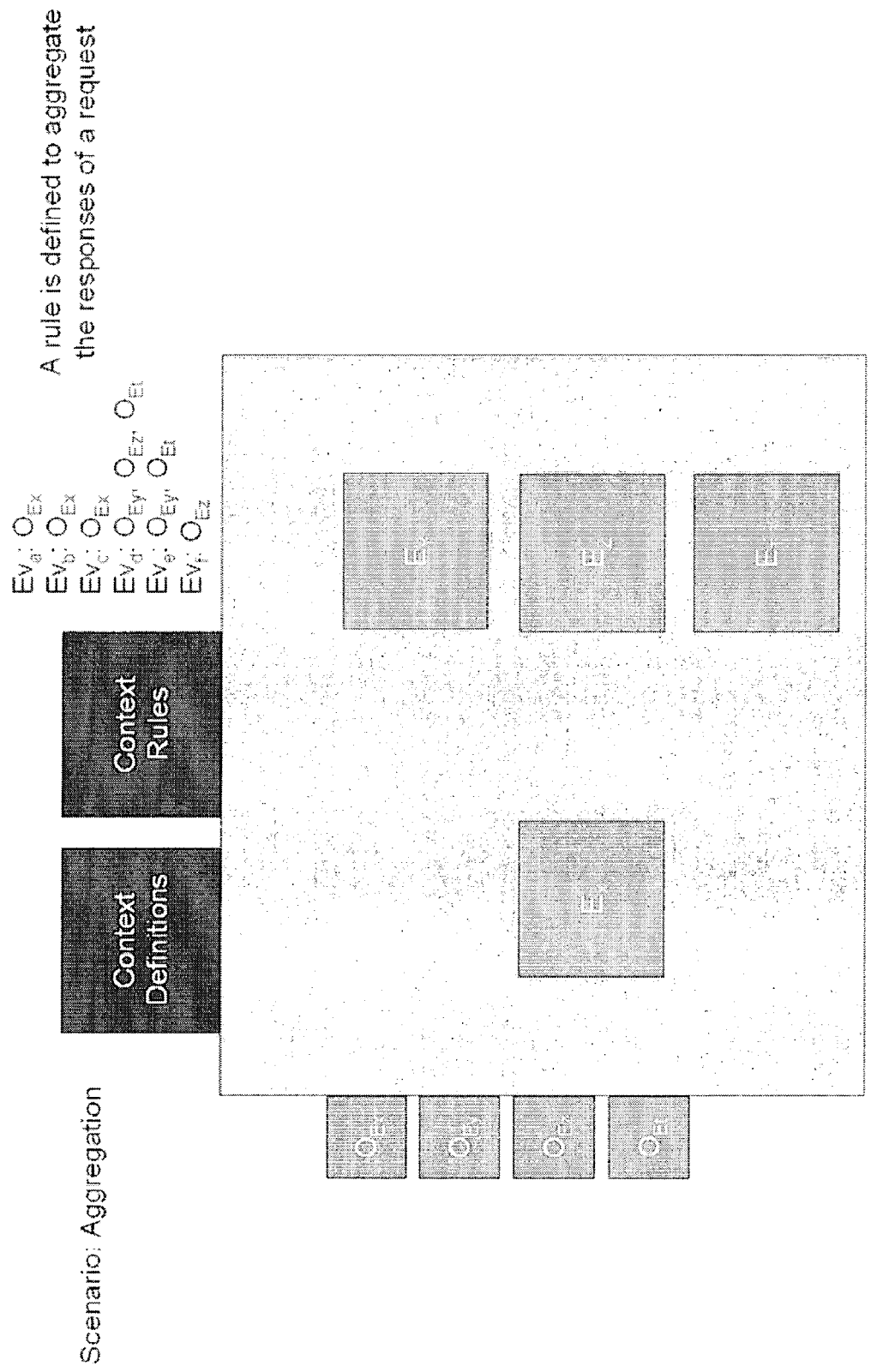
FIGS. 14A-14H illustrate one embodiment of an aggregation scenario of the invention.
Figure 14B:
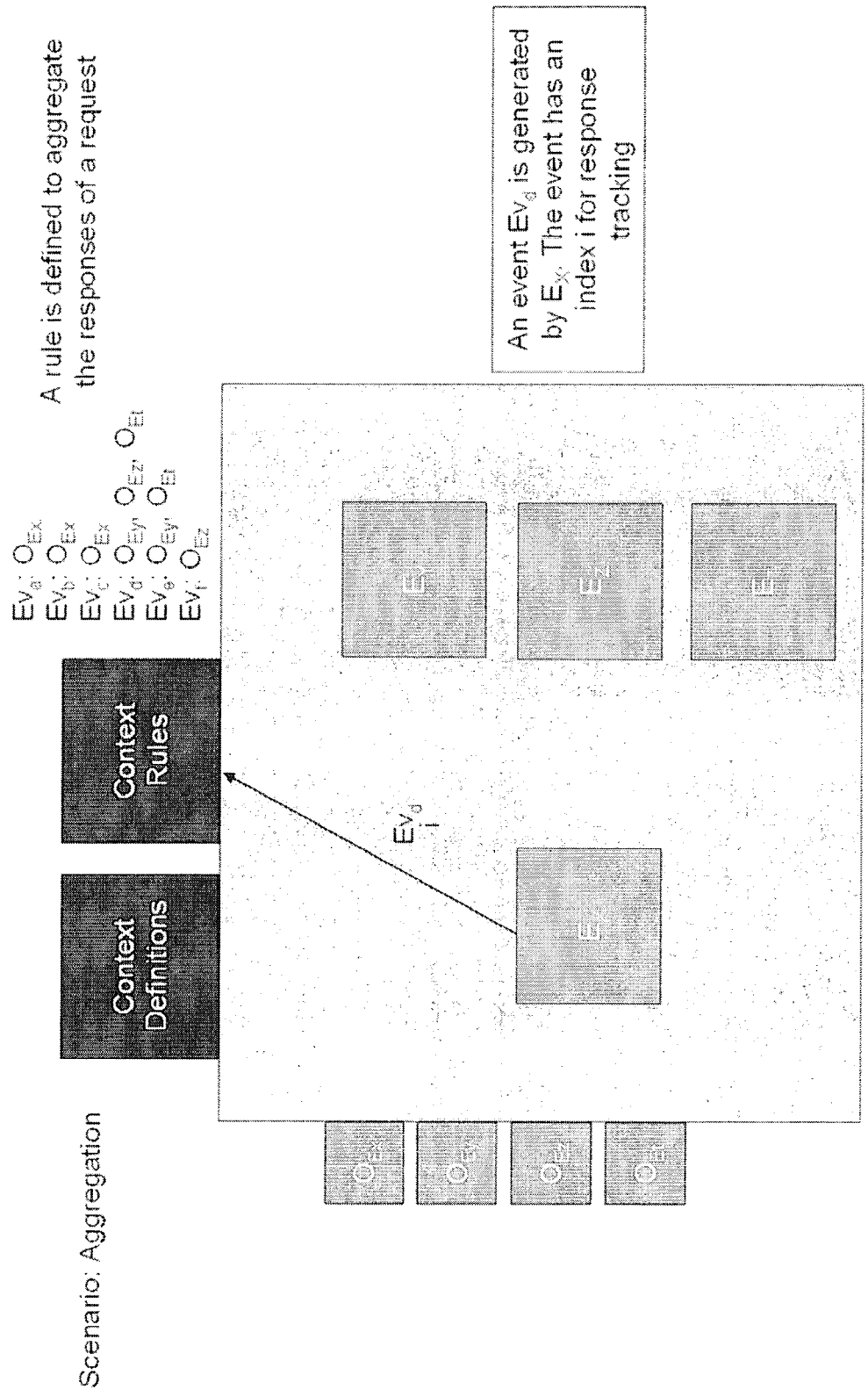
Figure 14C:
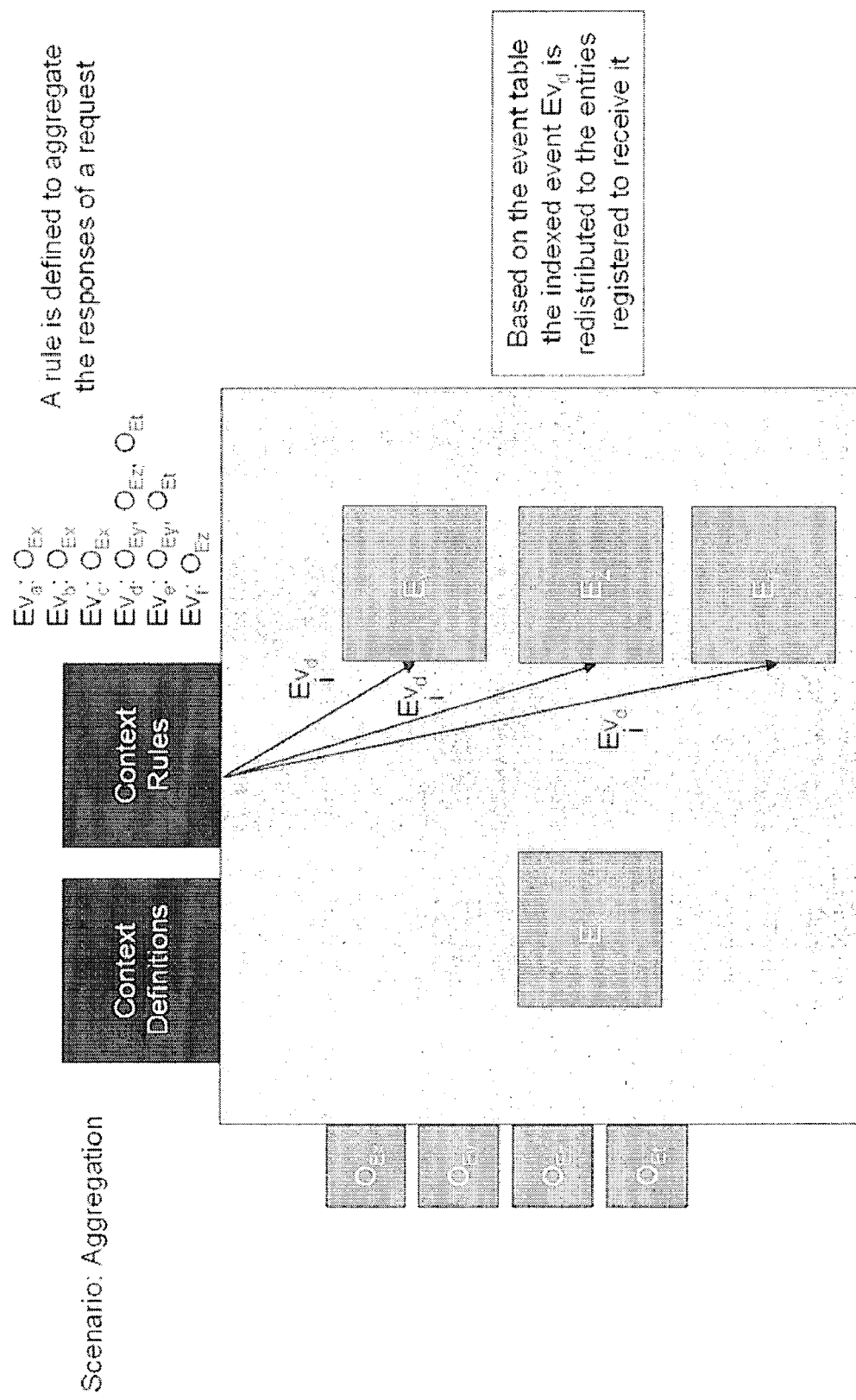
Figure 14D:
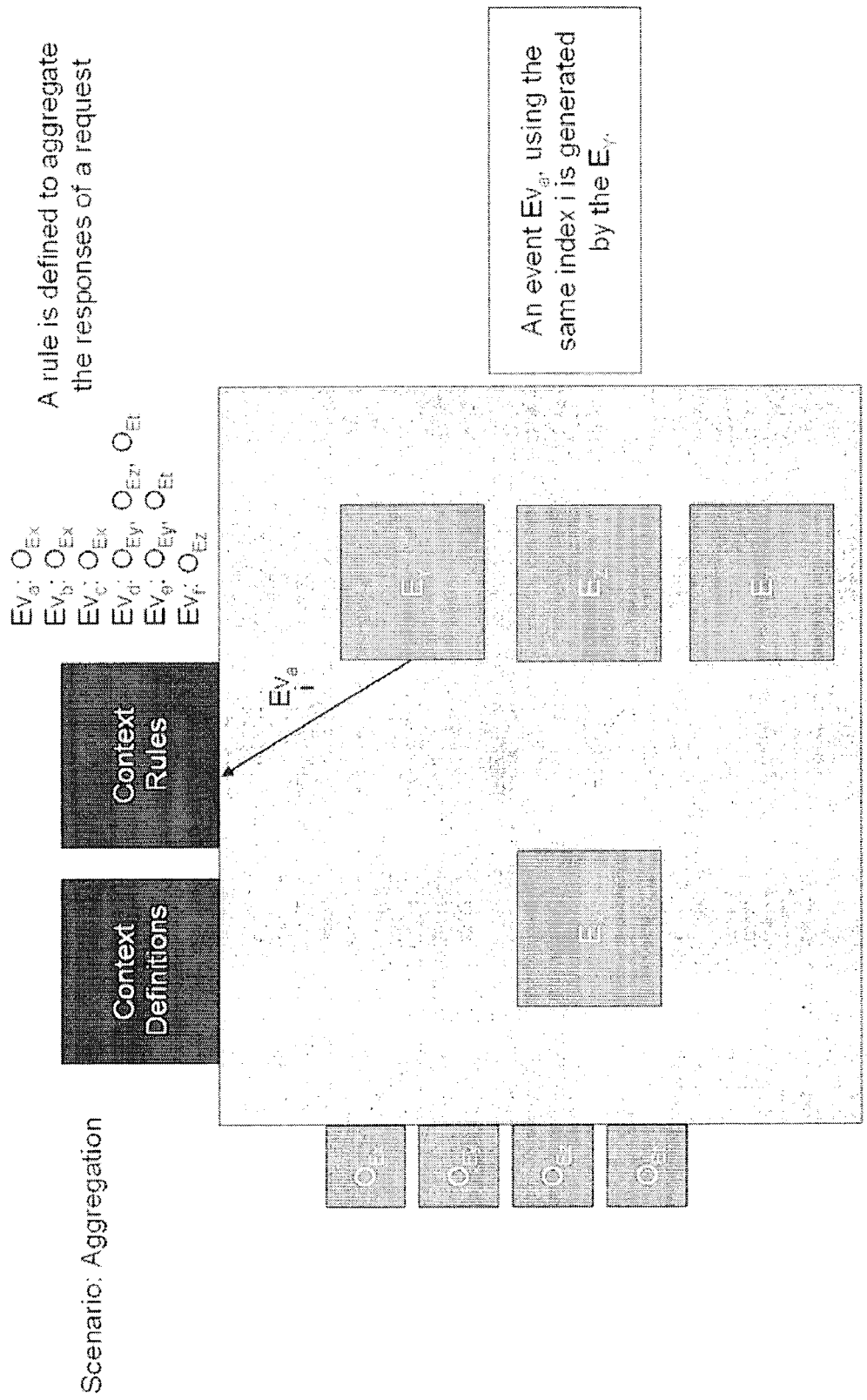
Figure 14E:
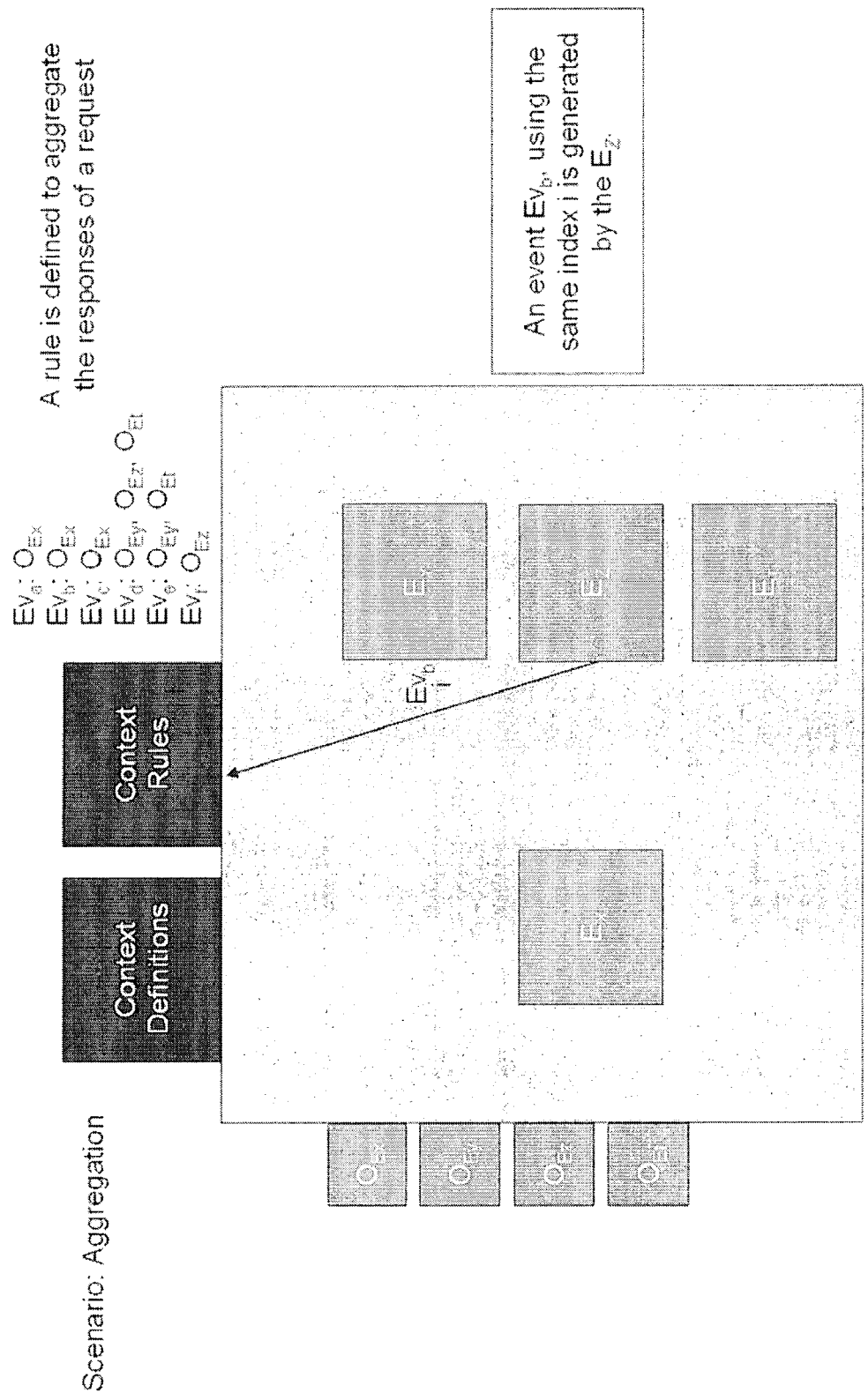
Figure 14F:
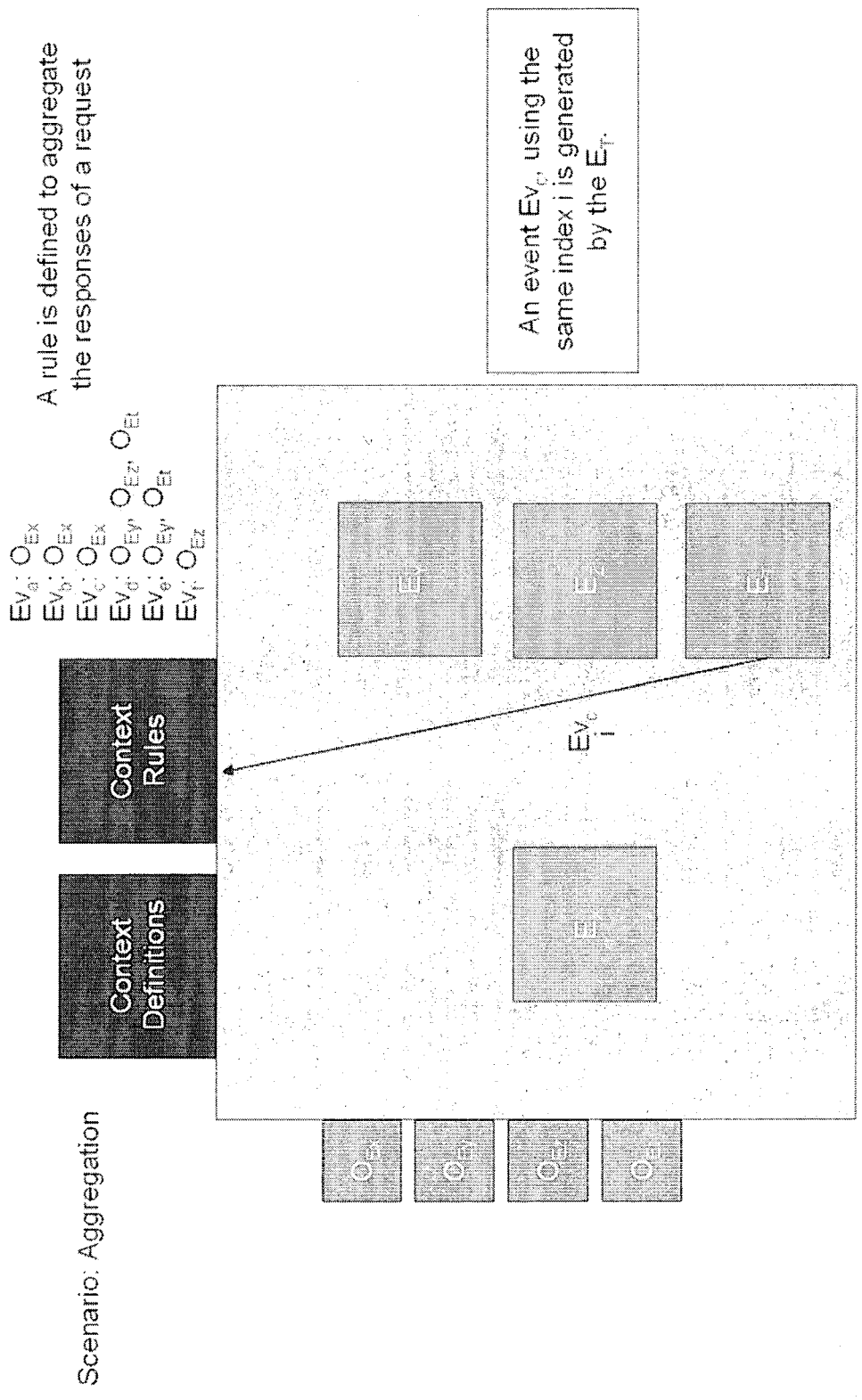
Figure 14G:
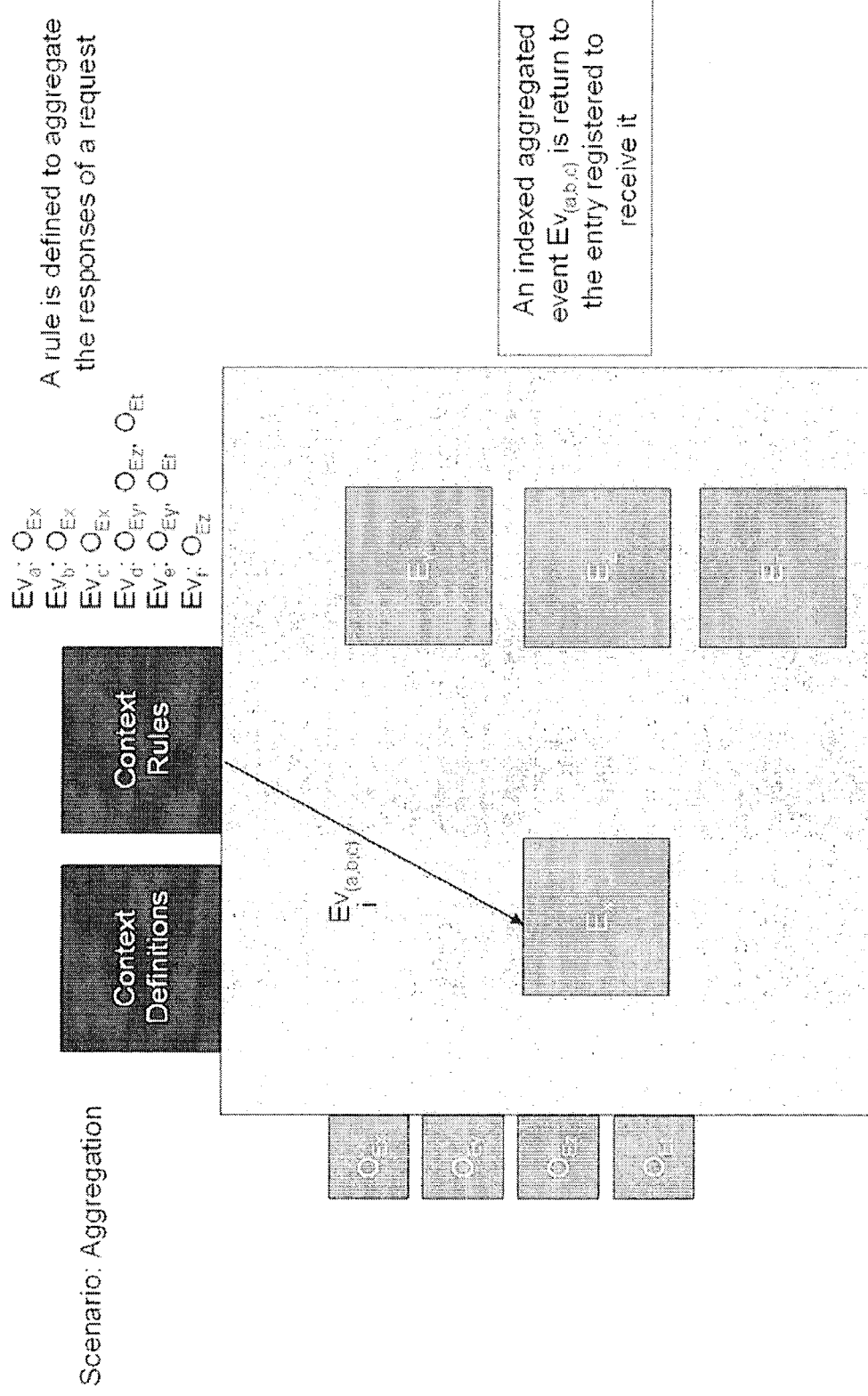
Figure 14H:
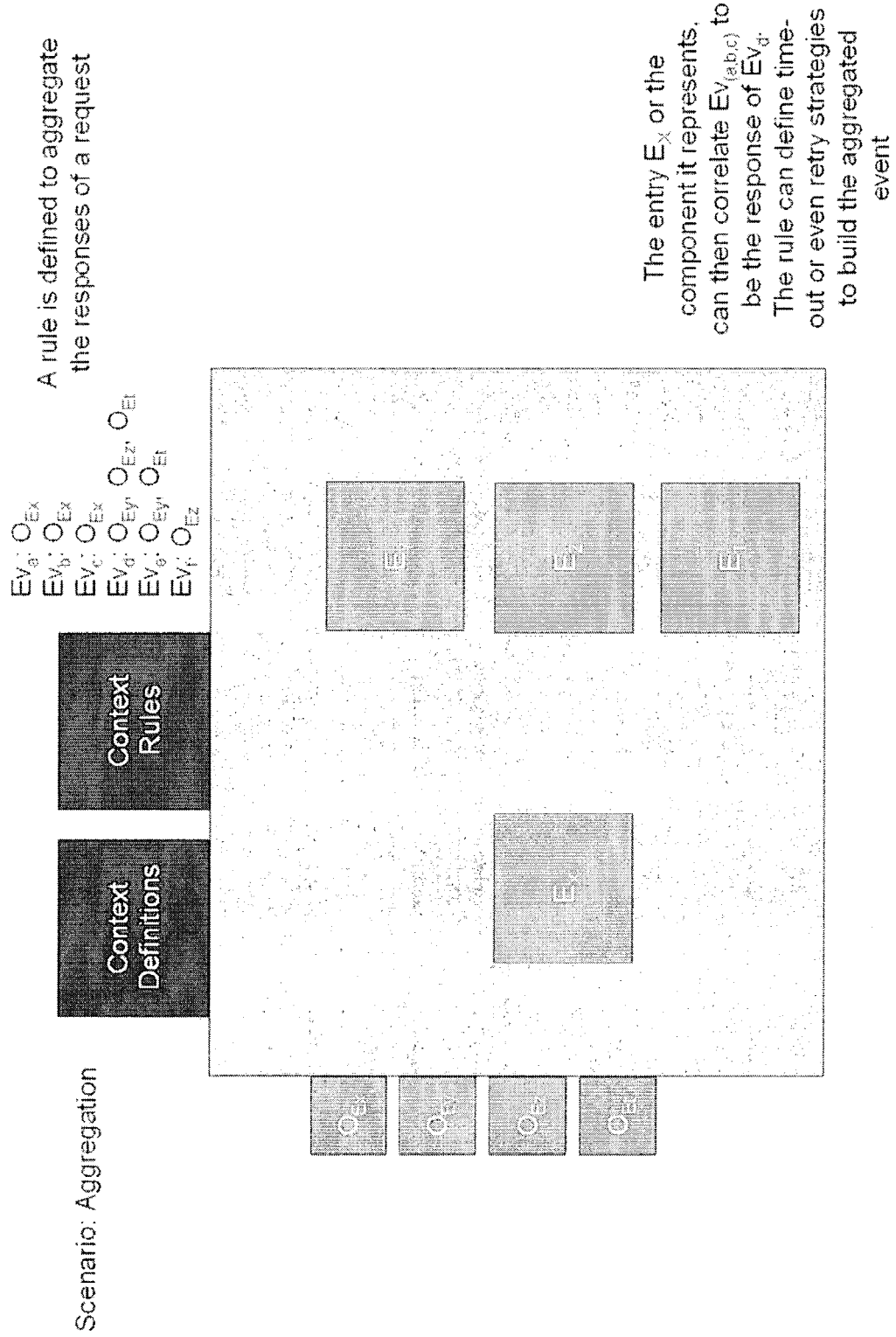

FIGS. 14A-14H illustrate one embodiment of an aggregation scenario of the invention. FIG. 14A shows an initial state of the system. A rule is defined to aggregate the responses of a request. In FIG. 14B, an event Evd is generated by Ex. The event has an index i for response tracking. In FIG. 14C, based on the event table the indexed event Evd is redistributed to the entries registered to receive it. In FIG. 14D an event Eva using the same index i is generated by the Ey. In FIG. 14E an event Evb using the same index i is generated by the Ez. In FIG. 14F an event Evc using the same index i is generated by the Et. In FIG. 14G, an indexed aggregated event Ev(a,b,c) is returned to the entry registered to receive it (Ex). In FIG. 14H, thus the entry Ex or the component it represents can then correlate Ev(a,b,c) to be the response of Evd. The rule defined for aggregation may in addition to defining associations also define other parameters, such as, defining time-outs, retry strategies, etc., to build the aggregated event.

Figure 15A:
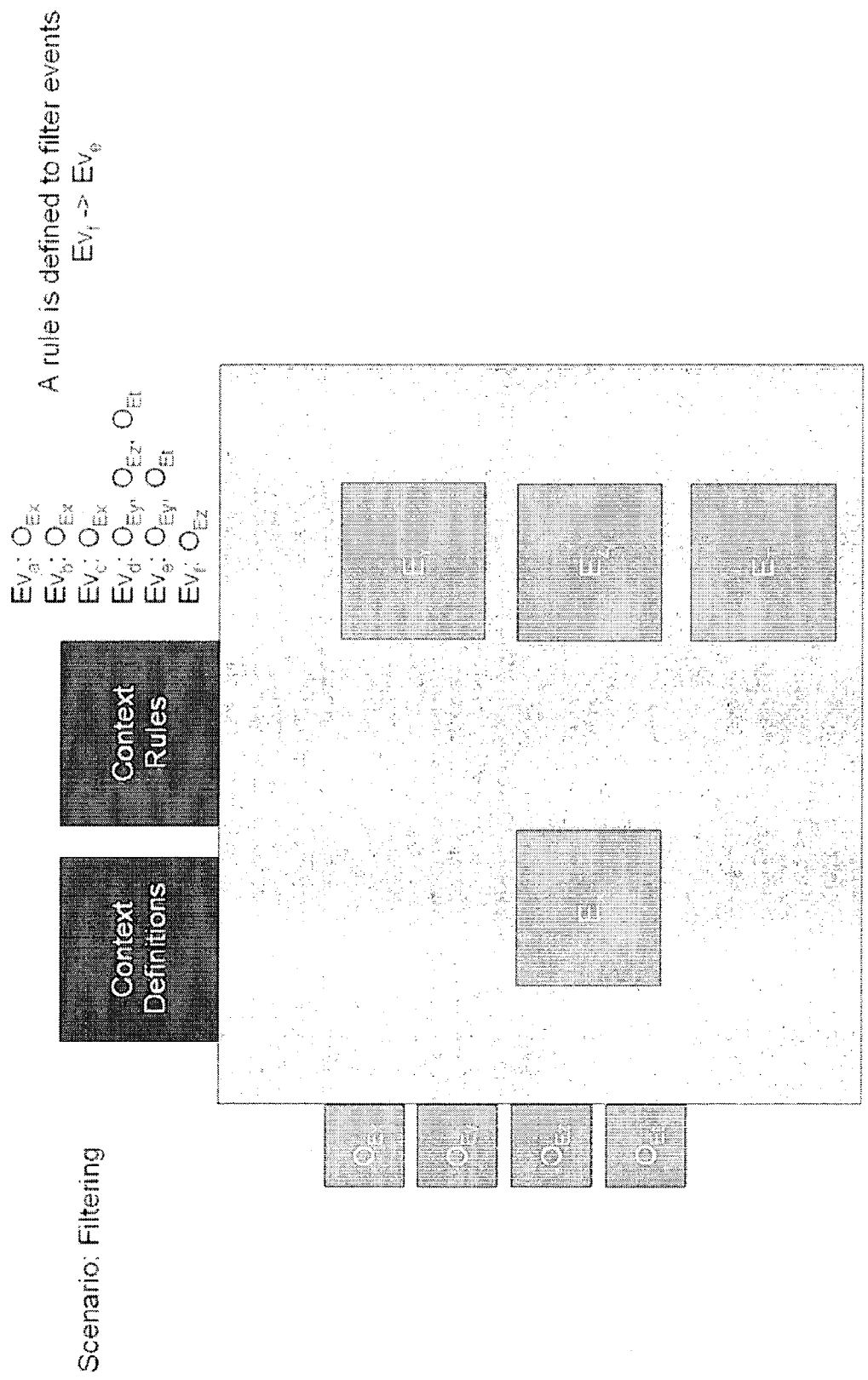
FIGS. 15A-15D illustrate one embodiment of a filtering scenario of the invention.
Figure 15B:
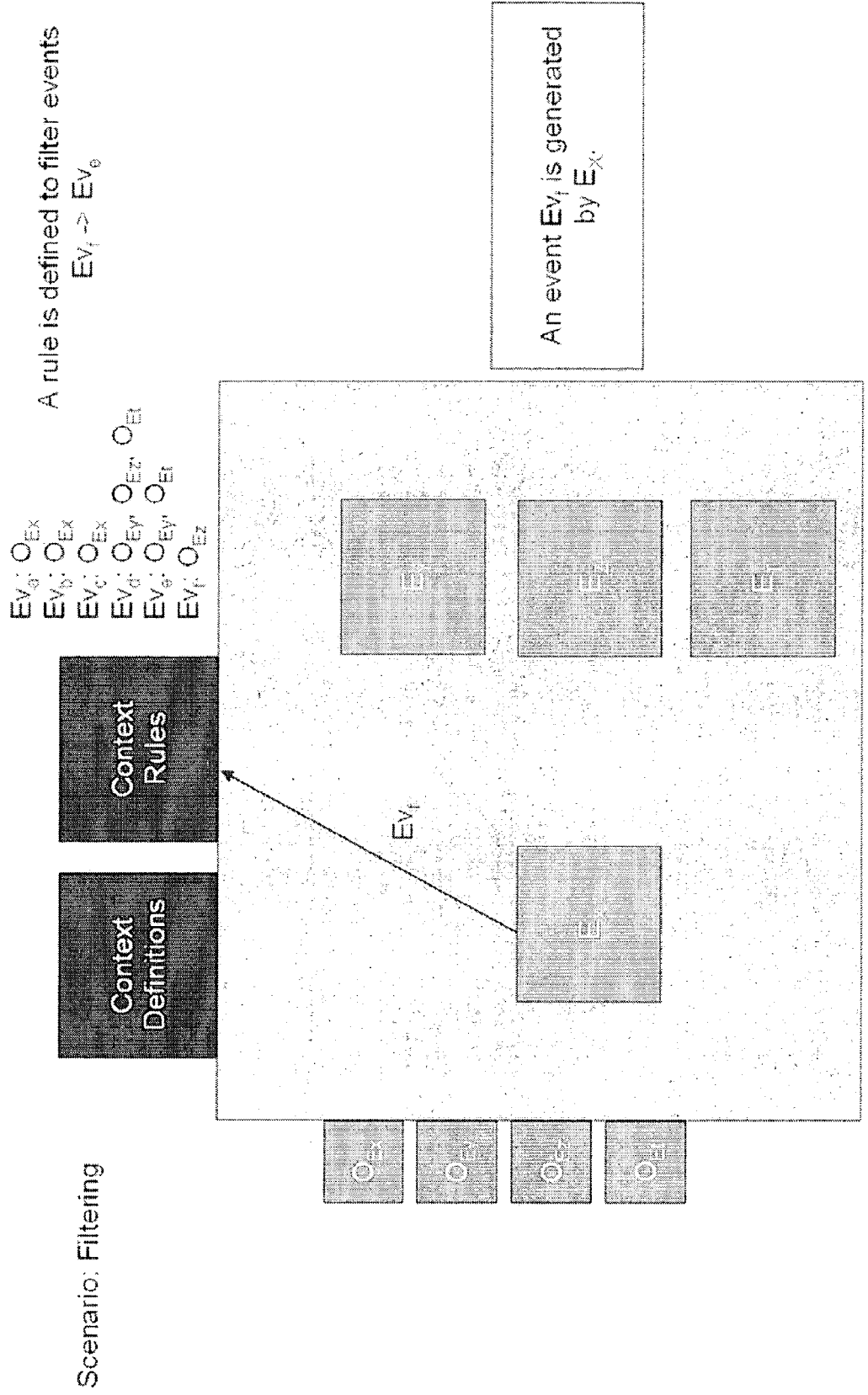
Figure 15C:
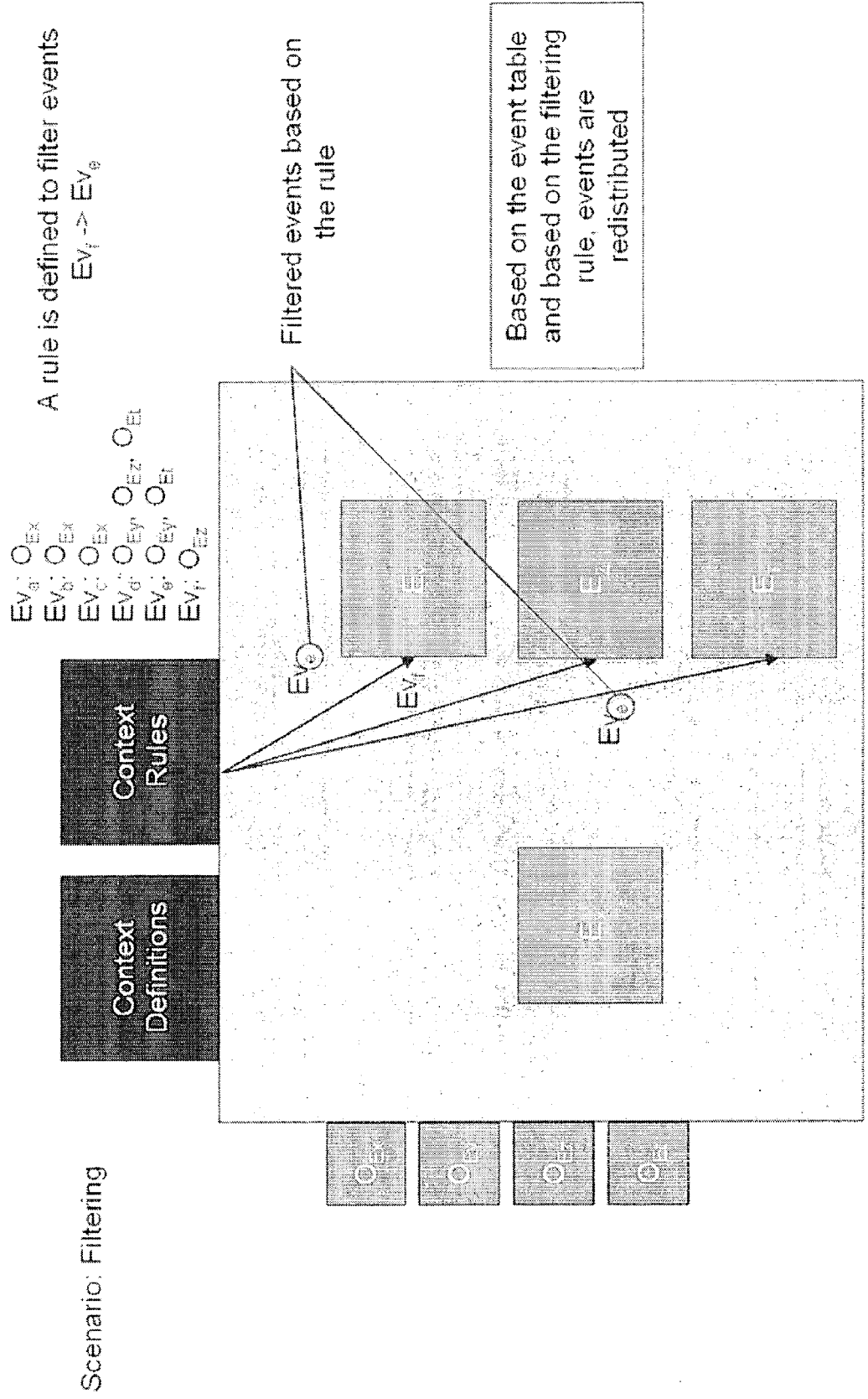
Figure 15D:
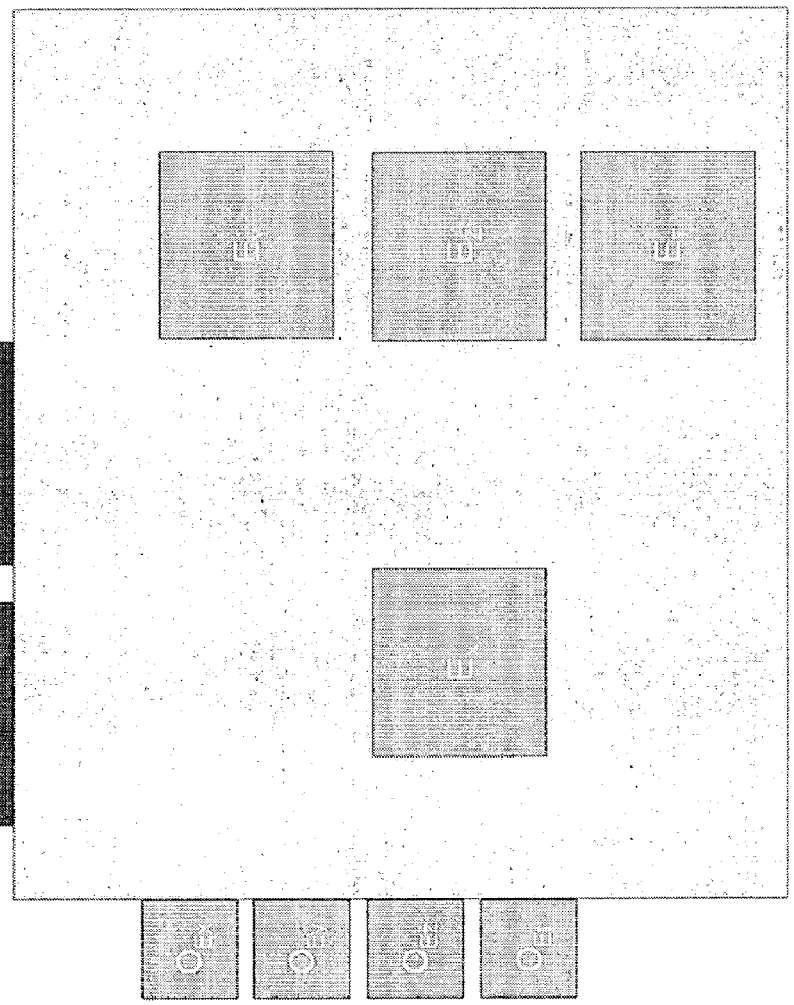

FIGS. 15A-15D illustrate one embodiment of a filtering scenario of the invention. FIG. 15A shows an initial state of the system. A rule is defined to filter events (for example, Evf->Eve). In FIG. 15B, an event Evf is generated by Ex. In FIG. 15C, based on the event table, and based on the filtering rule, events are redistributed. Thus, Evf goes to Ez based on the table, and Eve is sent to Ey and Et based on the filtering and the table. In FIG. 15D, the entries Ex, Ey, and Et are not aware of the filtering.

Figure 16A:
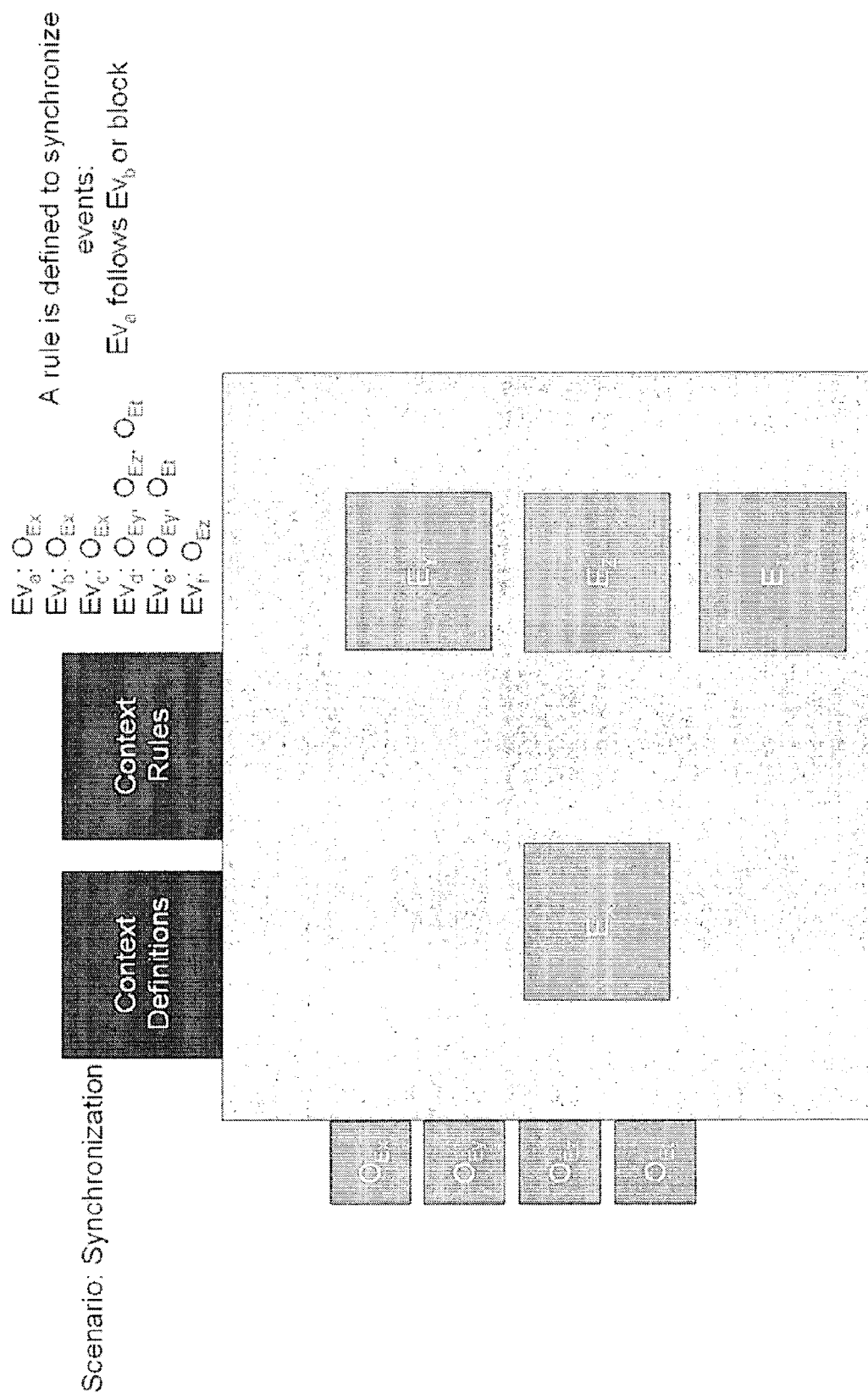
FIGS. 16A-16D illustrate one embodiment of a synchronization scenario of the invention.
Figure 16B:
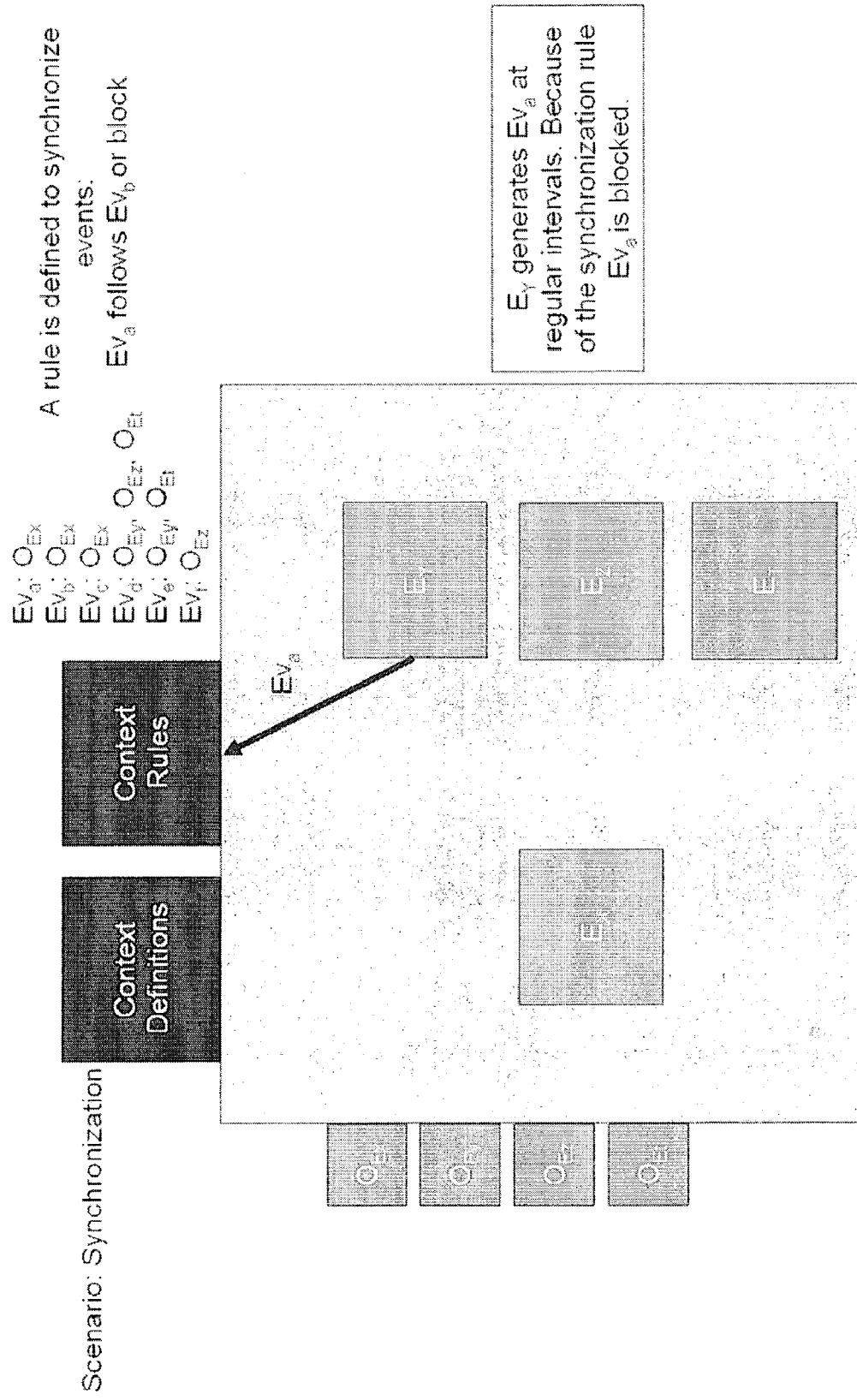
Figure 16C:
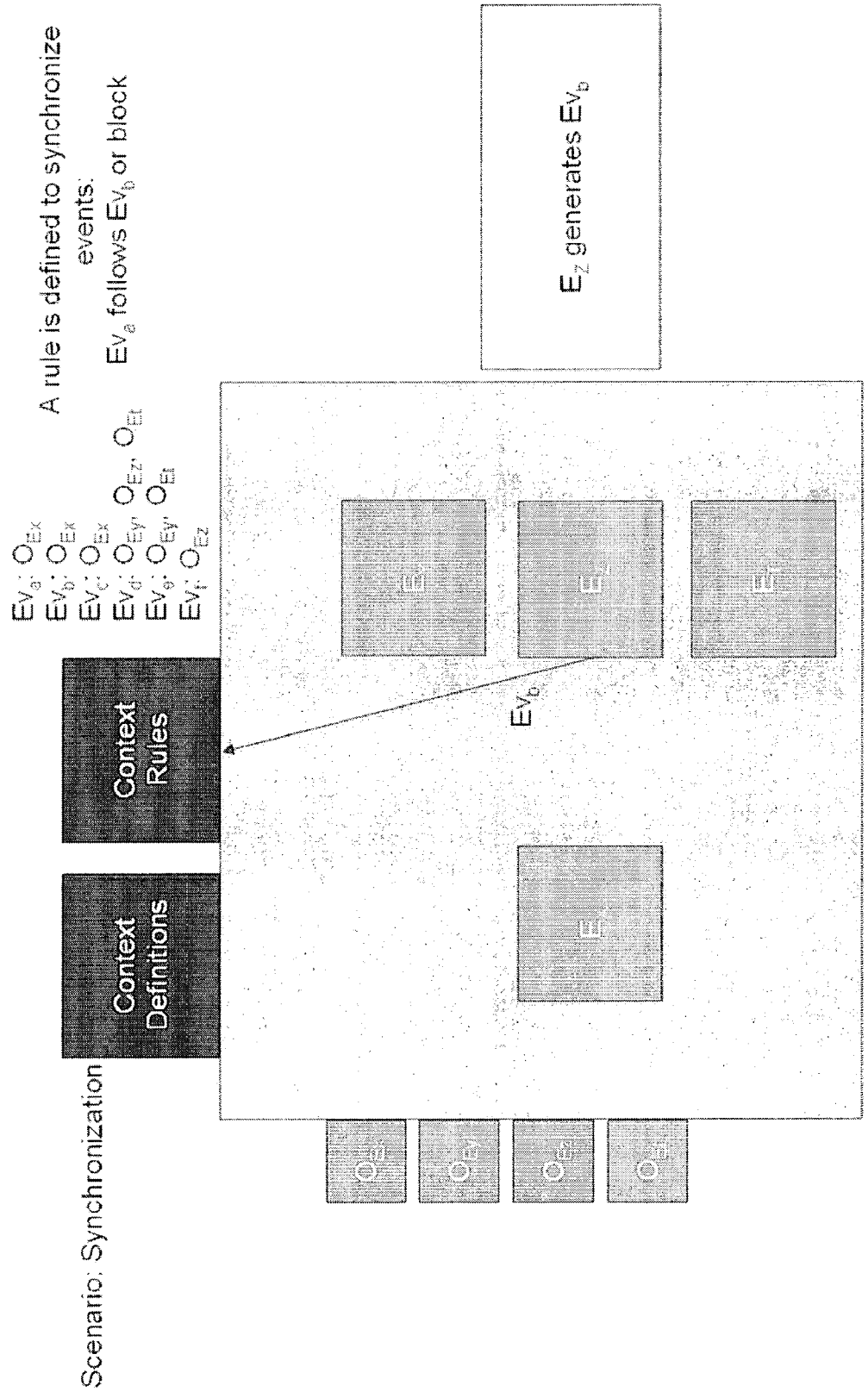
Figure 16D:
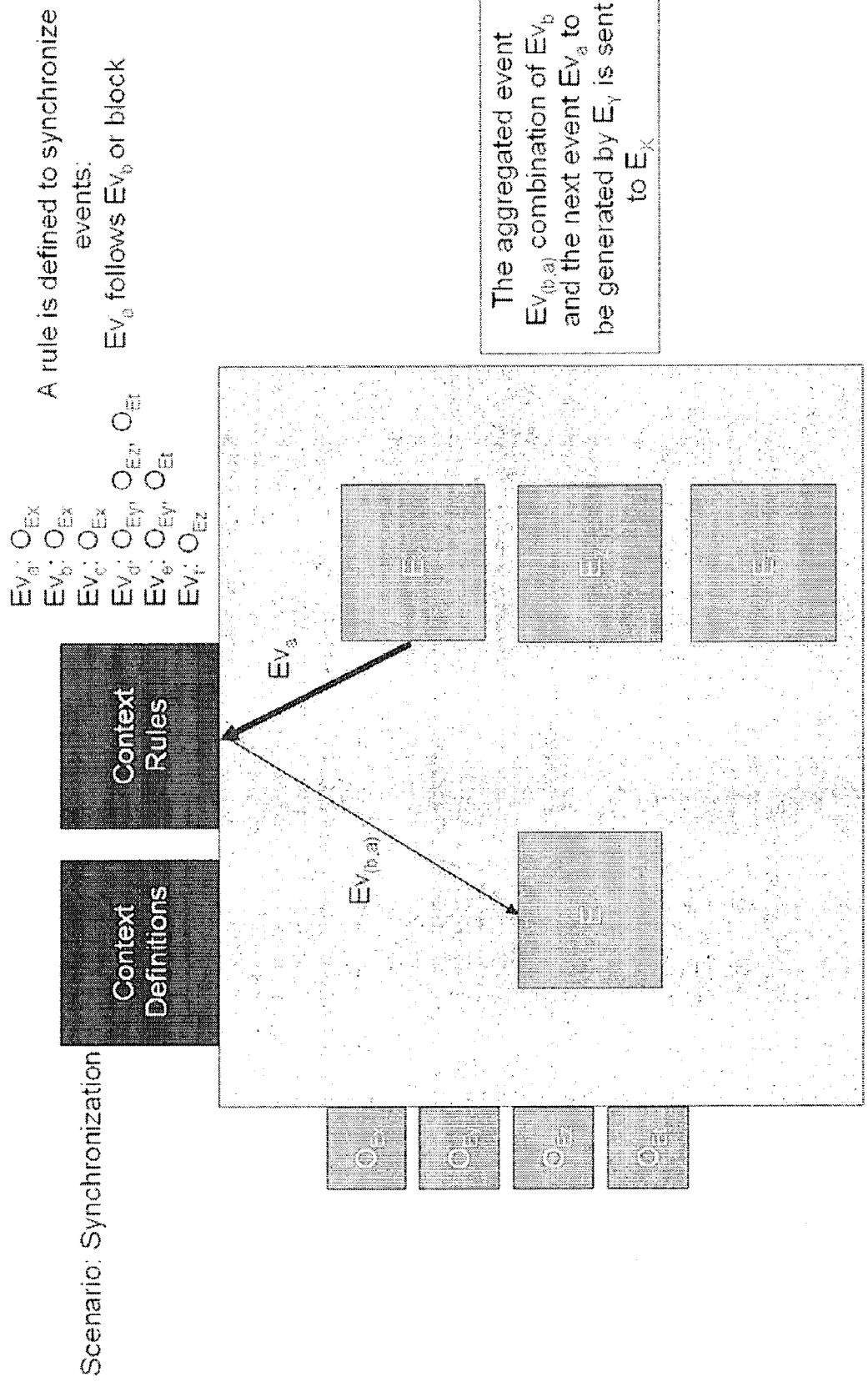

FIGS. 16A-16D illustrate one embodiment of a synchronization scenario of the invention. FIG. 16A shows an initial state of the system. A rule is defined to synchronize events (for example, Eva follows Evb or it is blocked). In FIG. 16, Ey generates Eva at regular interval, however because of the synchronization rule Eva is blocked (Eva did not follow an Evb). In FIG. 16C Ez now generates Evb. In FIG. 16D, the aggregated event Ev(b,a) a combination of Evb and next event Eva to be generated by Ey is sent to Ex. Thus, the Eva which follows the Evb satisfies the synchronization rule and the aggregate event Ev(b,a) is sent.

Figure 17A:
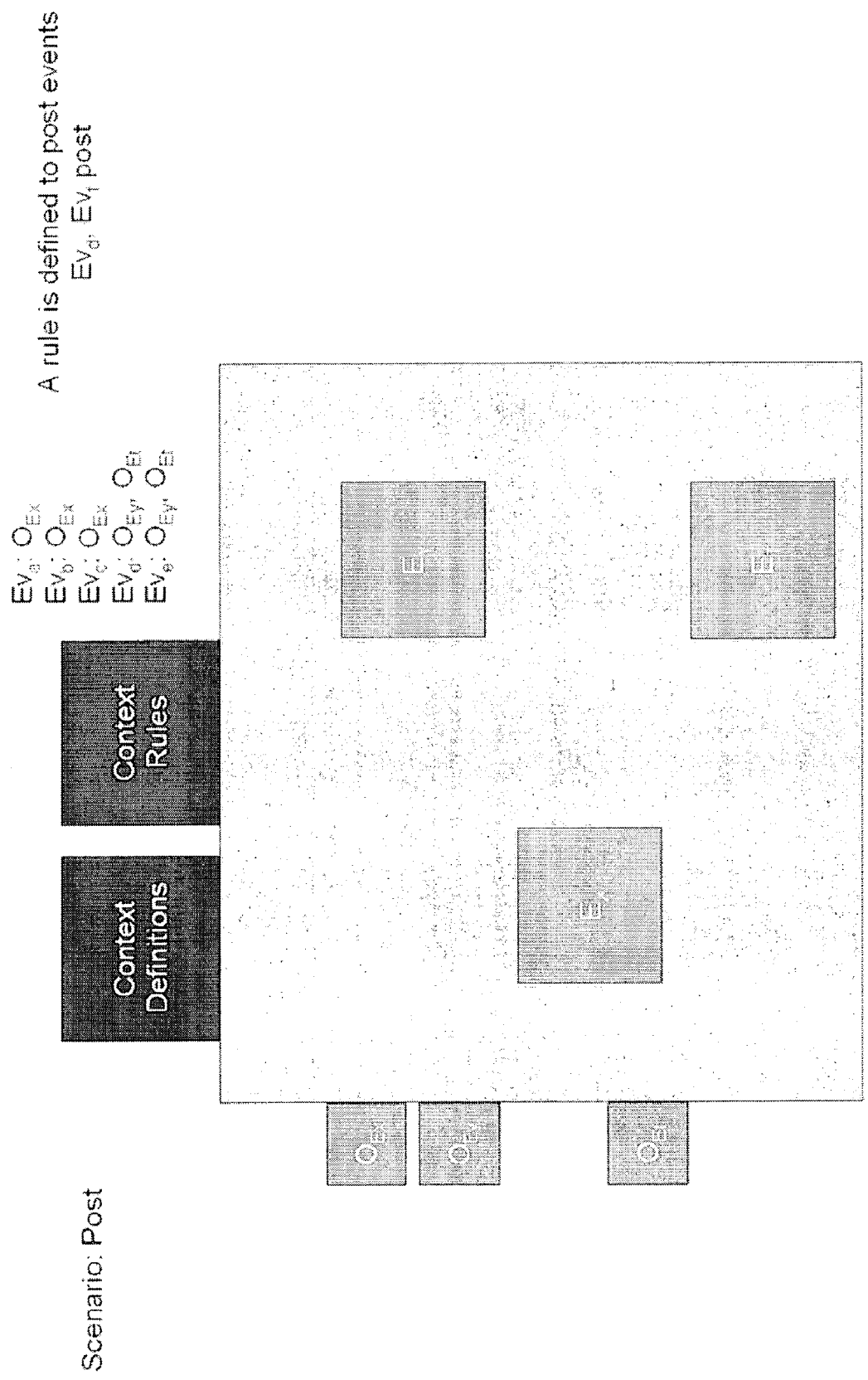
FIGS. 17A-17G illustrate one embodiment of a post scenario of the invention.
Figure 17B:
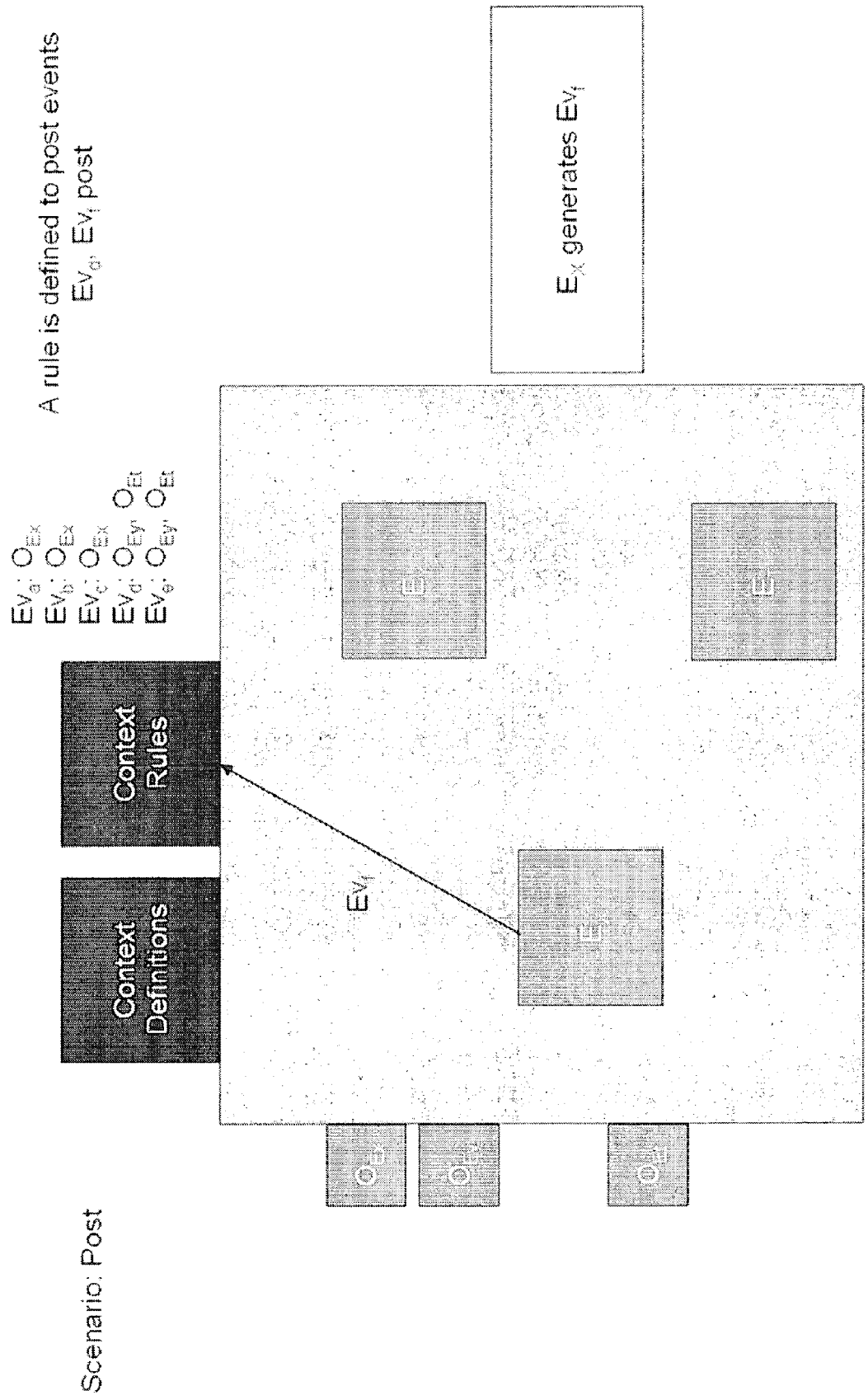
Figure 17C:
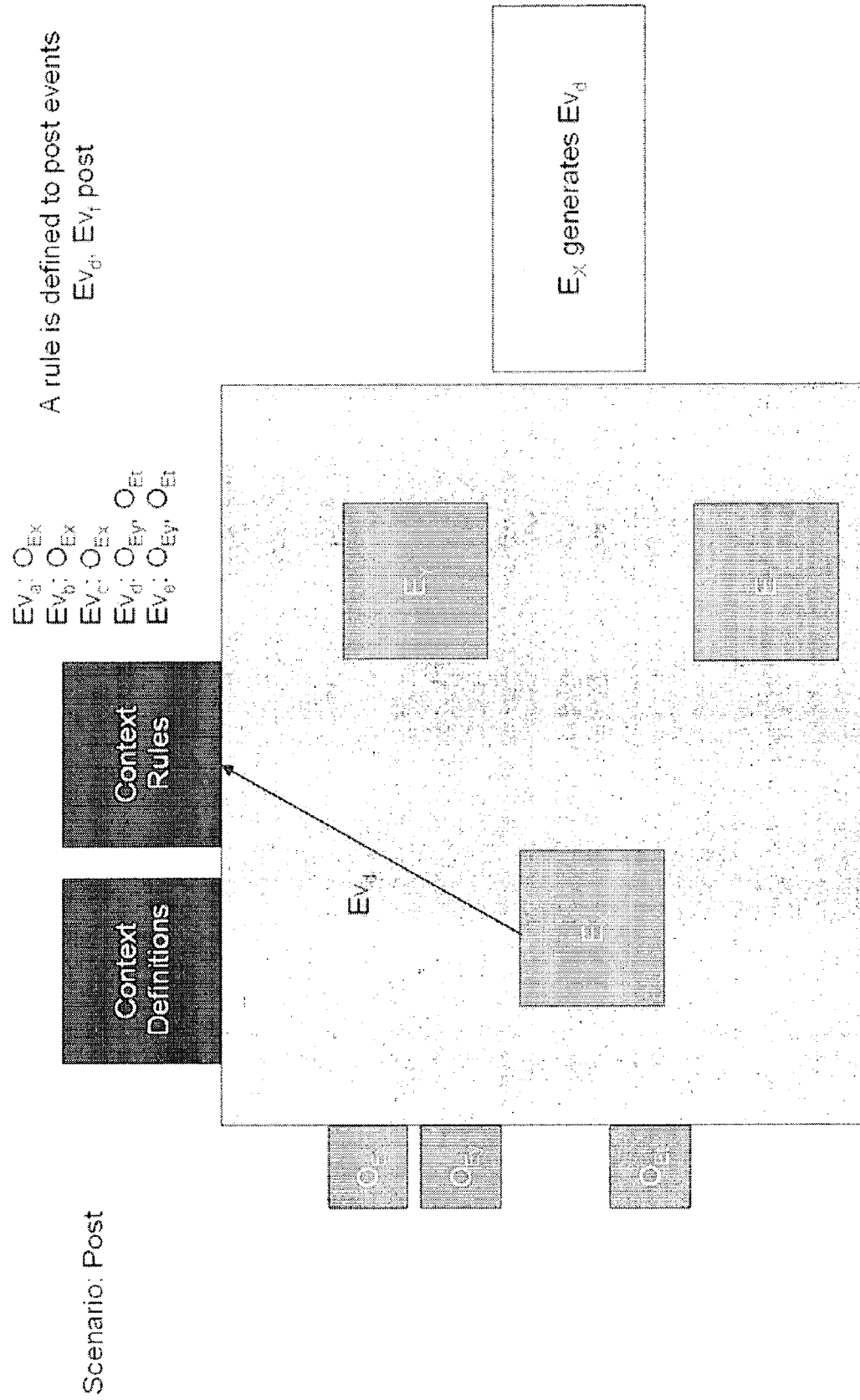
Figure 17D:
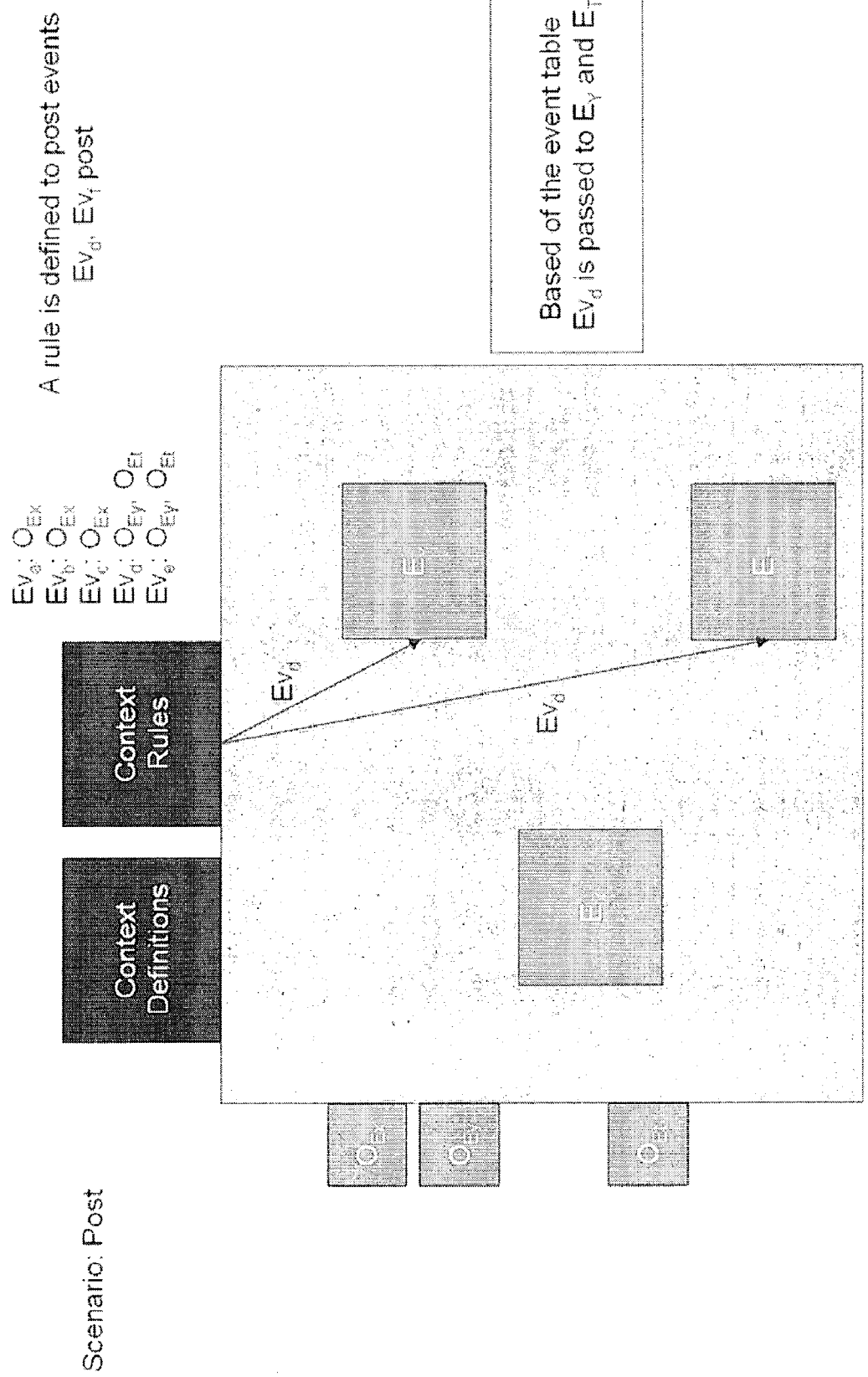
Figure 17E:
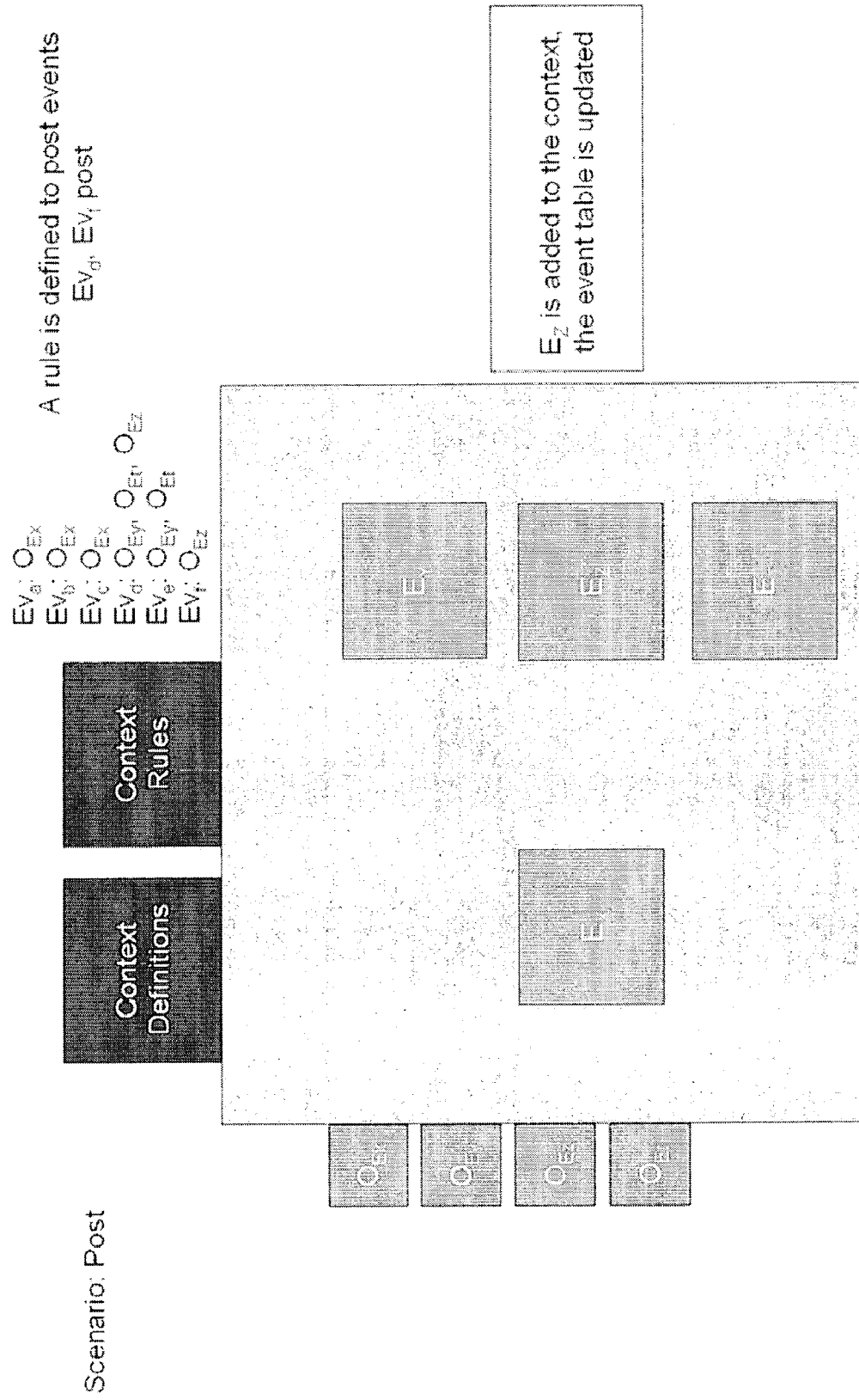
Figure 17F:
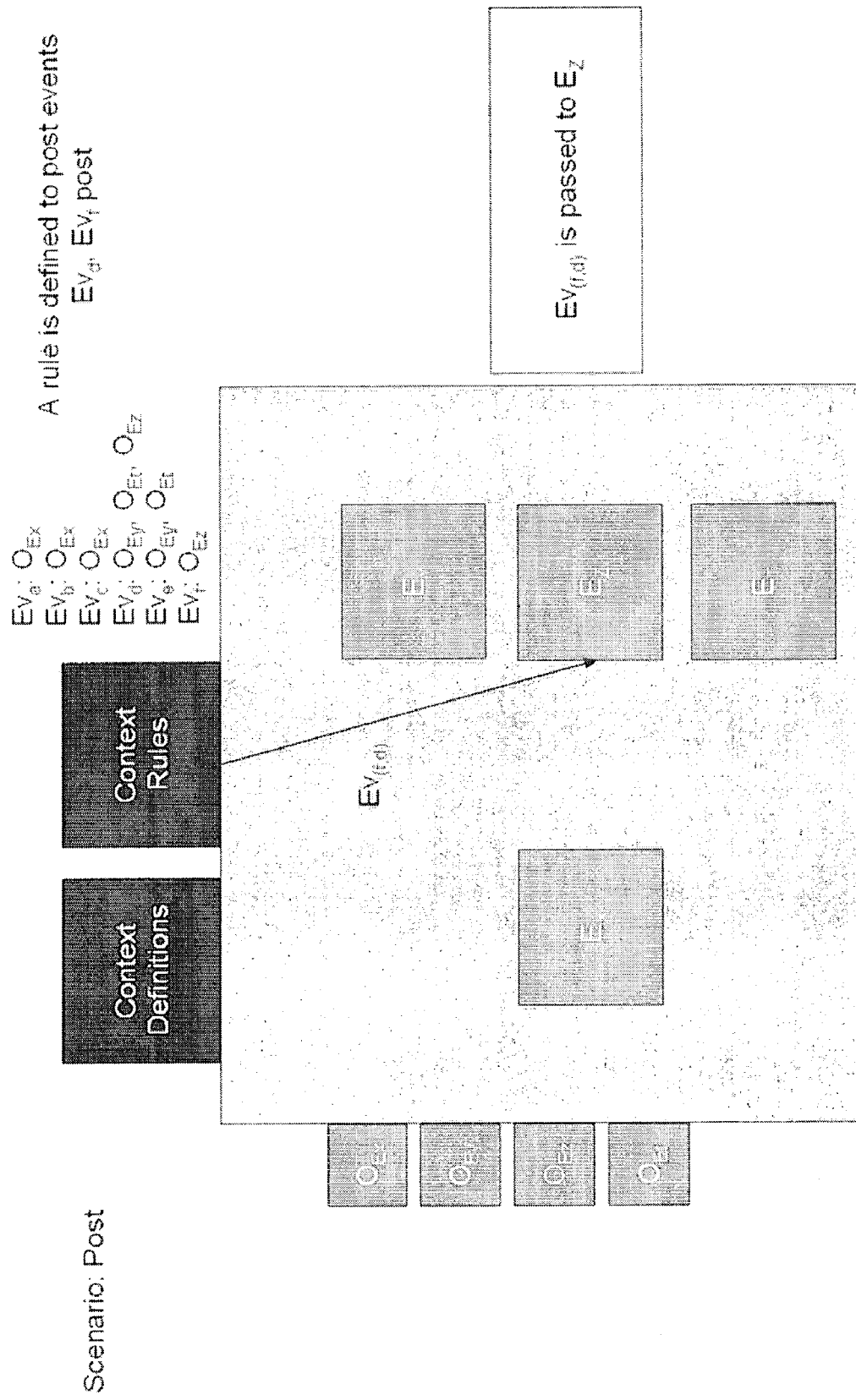
Figure 17G:
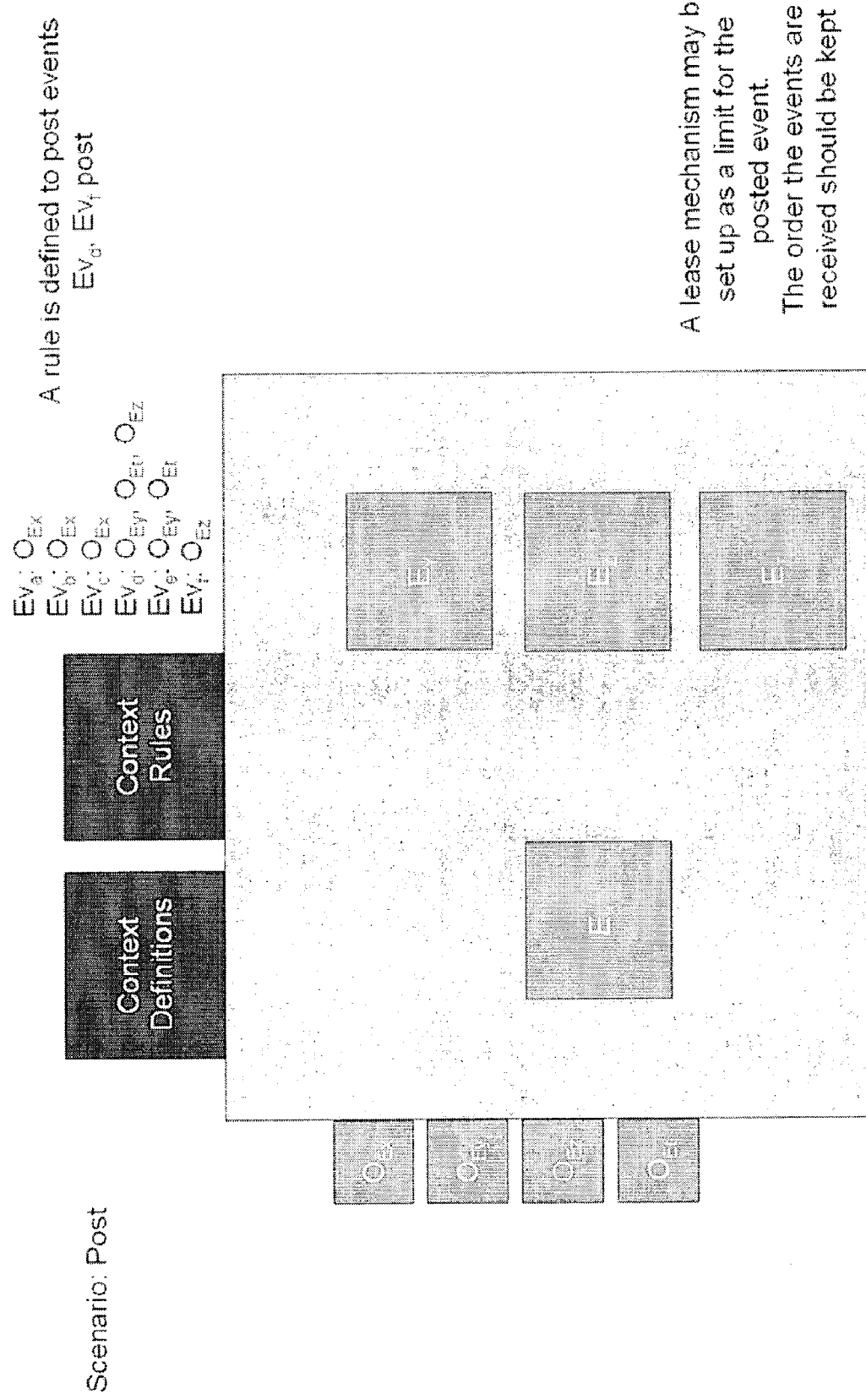

FIGS. 17A-17G illustrate one embodiment of a post scenario of the invention. FIG. 17A shows an initial state of the system. A rule is defined to post events (for example, Evd causes a Evf post). In FIG. 17B, Ex generates Evf. This event is not posted using the example rule because it is not Evd. In FIG. 17C Ex generates Evd (to which the post rule is applicable). In FIG. 17D, based on the event table Evd is passed to Ey and Et. In FIG. 17E, Ez is added to the context and the event table is updated. In FIG. 17F, Ev(f,d) is passed to Ez. Note that Evf is passed to Ez based on the earlier event Evf (FIG. 17B) and the current context. Note that Evd is passed to Ez based on the earlier event Evd (FIG. 17C) and the current context. These two events being passed are denoted by Ev(f,d). FIG. 17G shows an embodiment where a lease mechanism may be set up as a limit for the posted event. Also, the order in which the events are received should be kept. In this way events, such as synchronized events, may be handled properly.

Figure 18A:
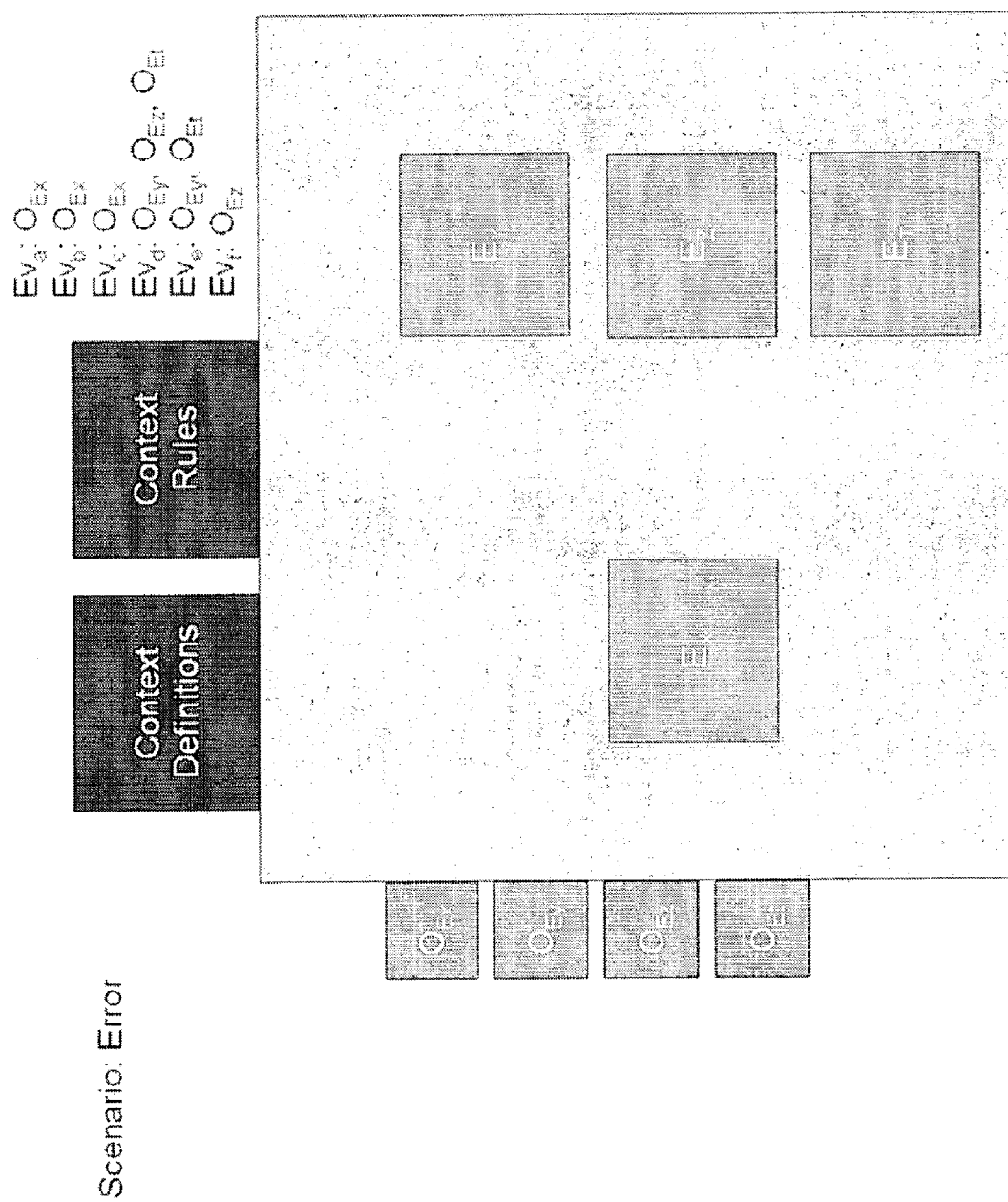
FIGS. 18A-18C illustrate one embodiment of an error scenario of the invention.
Figure 18B:
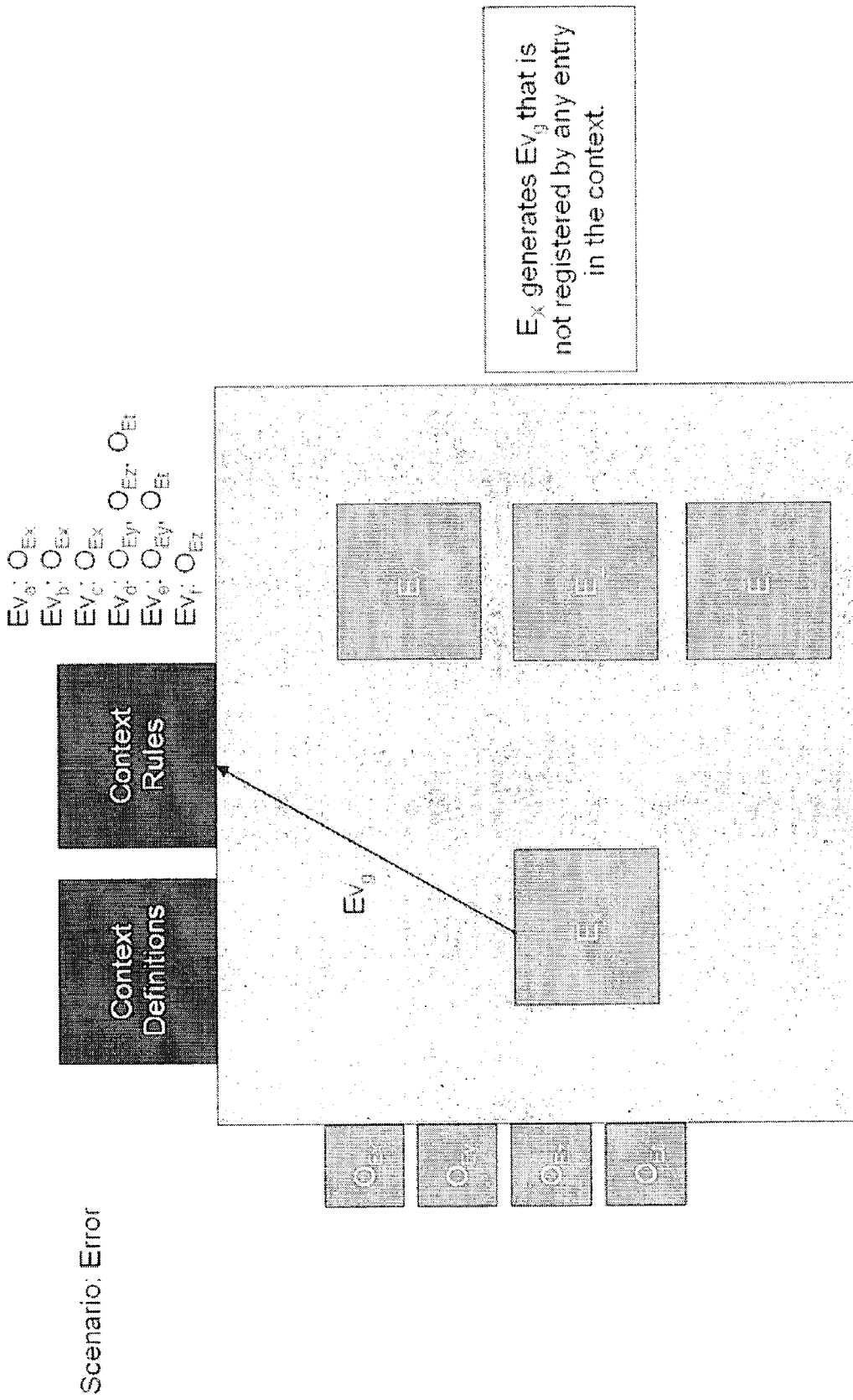
Figure 18C:
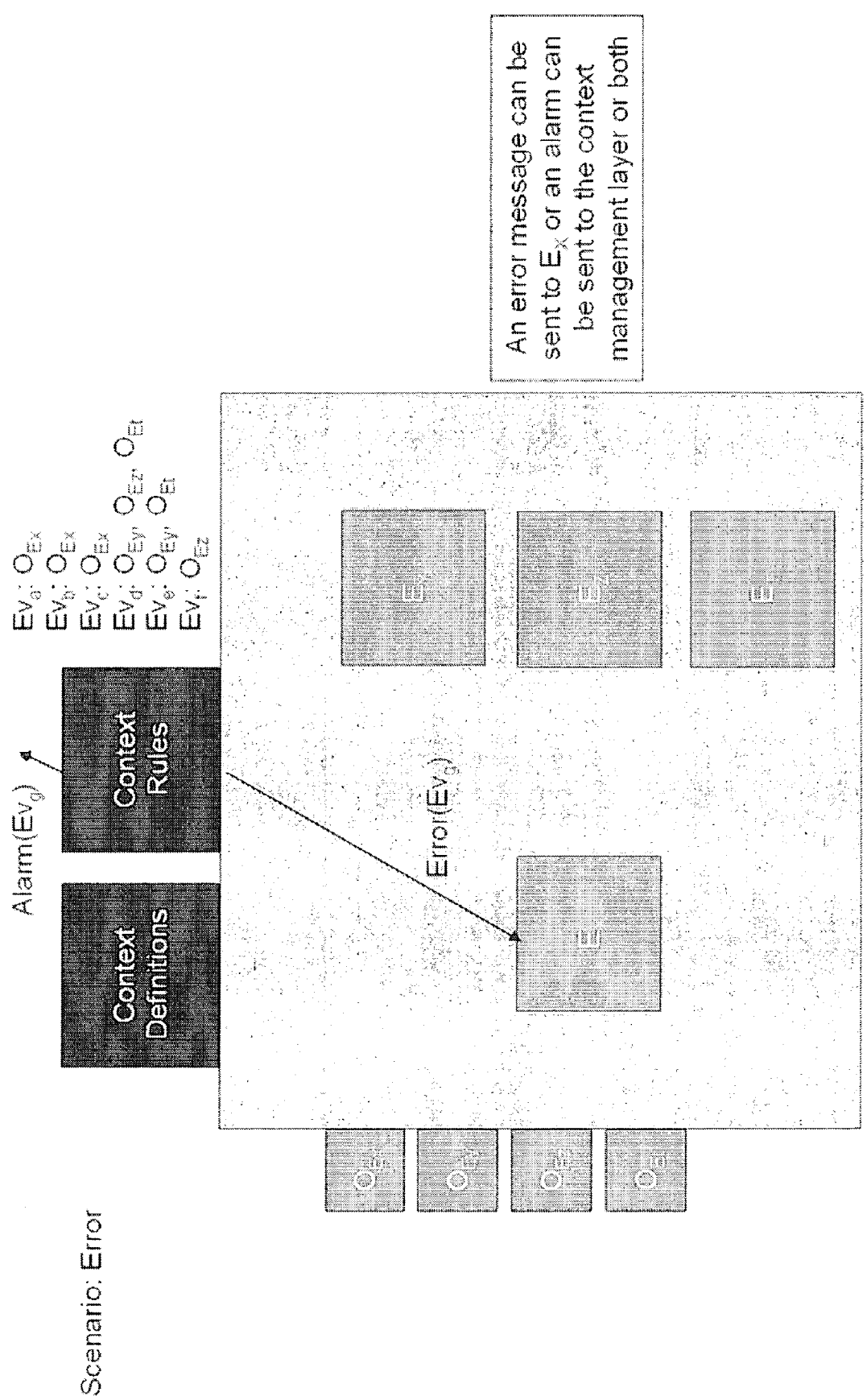

FIGS. 18A-18C illustrate one embodiment of an error scenario of the invention. FIG. 18A shows an initial state of the system. In FIG. 18B, Ex generates Evg which is not registered by any entry in the context. In FIG. 18C, as result of Evg being sent, an error message can be sent to Ex (Error(Evg)), or an alarm may be sent to the context management layer (Alarm (Evg)) or both may be sent. Other possible alarm scenarios are possible as well. For example, an error log may be maintained.

One embodiment of the invention in an application may be as follows. Assume that all the thermostats in a new building complex are capable of sending the current temperature to, and of being set by an external entity (for up to 1 hour). Assume further that the thermostats when plugged in and powered on, registered with a service bureau via their network connection. In one simple example, each of the devices may be associated with the nearest two fire stations. Groups of devices belonging to the same fire stations may be aggregated. Assume now that the thermostats are programmed to send a fire alert event when they sense a temperature over, say 50 deg C. This event if associated with others may then call the fire department, the police, etc. Assume now that we add a context to the event. That is, during the day there are two fire stations operational, however at night, only one is operational. Therefore, based on the time of day, the event may evoke a different response. Calling a closed fire station would be avoided by a proper context. From this simple example several of the aspects of the invention have been illustrated.

Many other embodiments of the invention are possible. For example, continuing the thermostat example, a power company may decide that setting a group of thermostats back 1 degree during a hot summer day may avoid having to purchase peak power at a premium.

Figure 1:
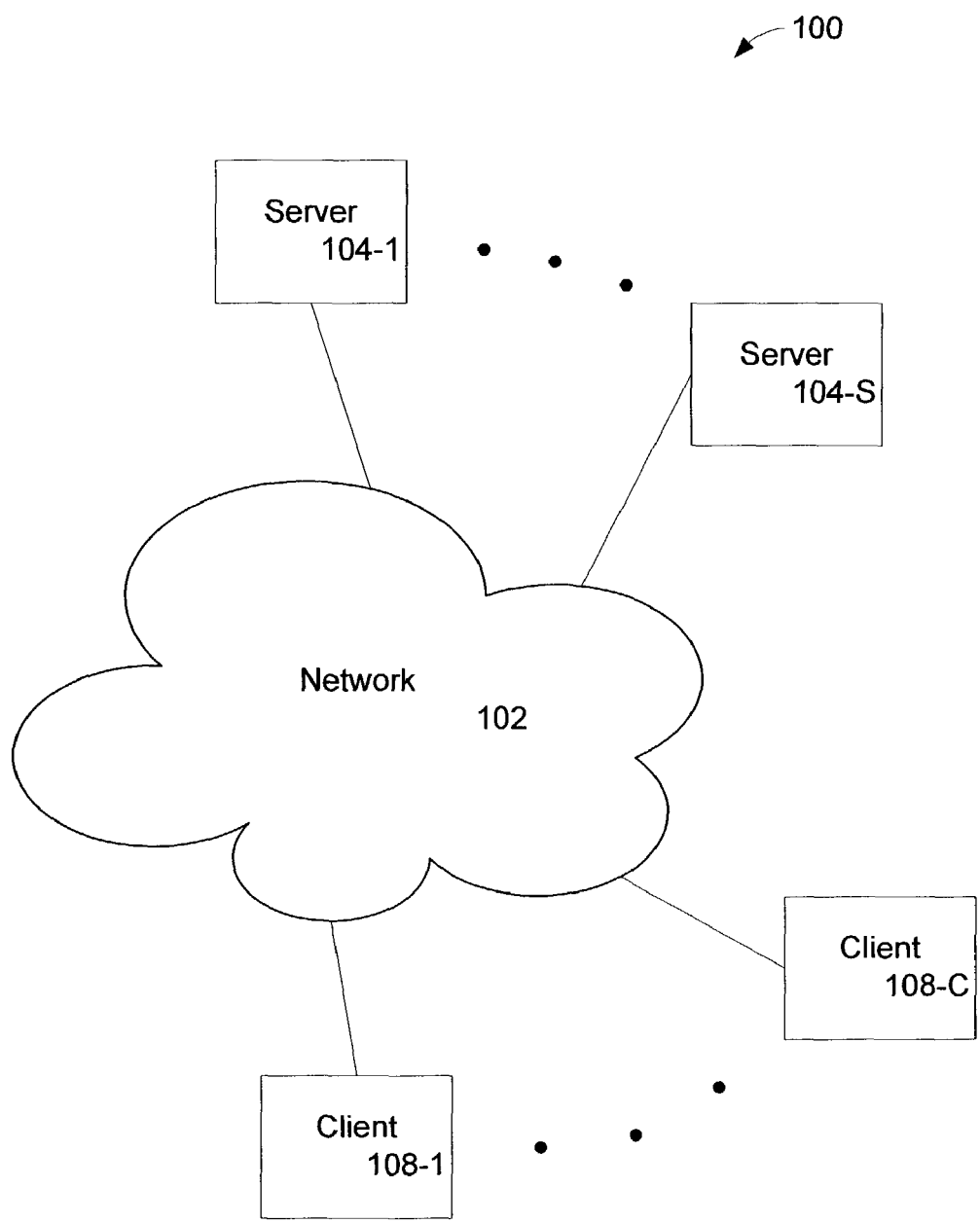
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
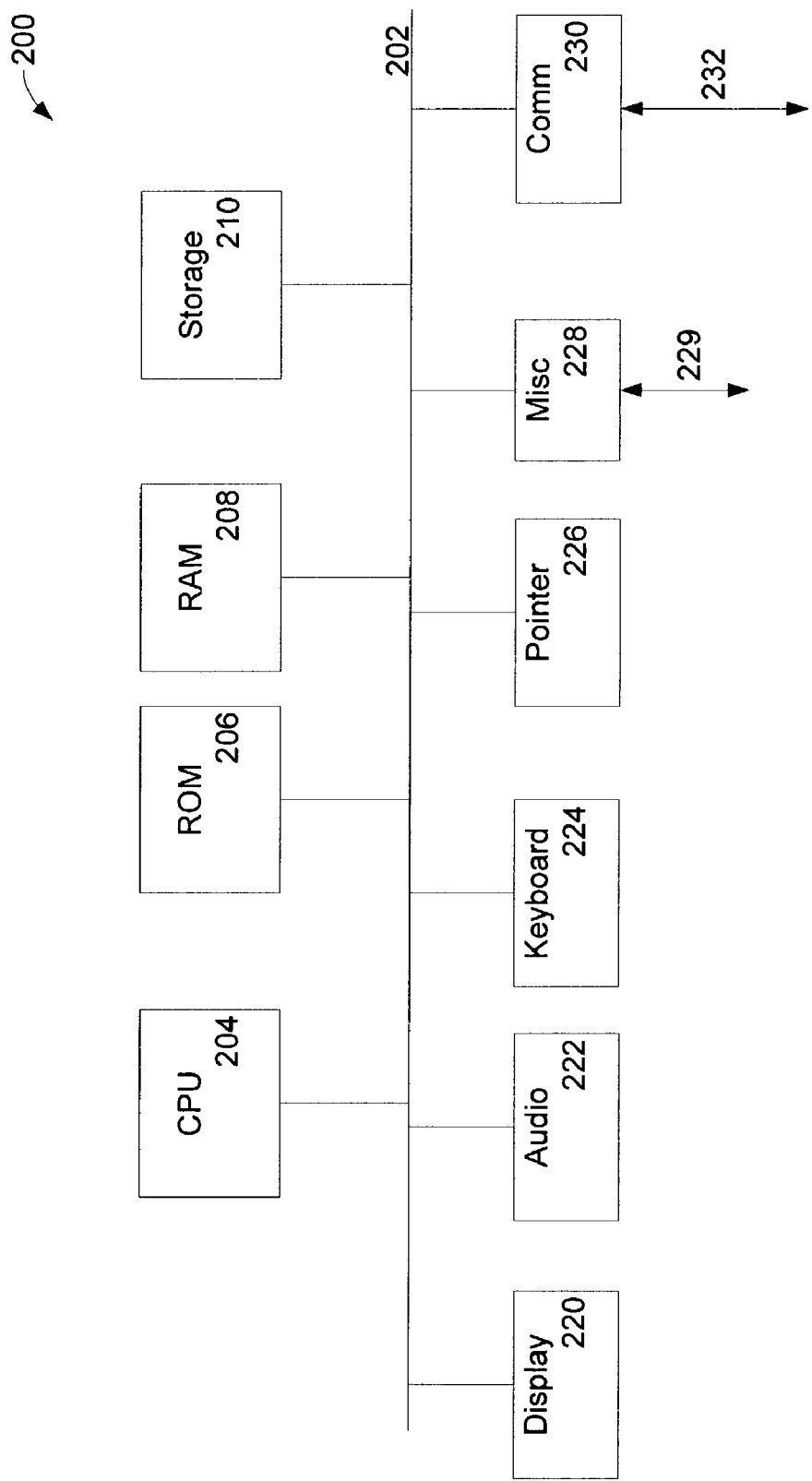
FIG. 2 is a block diagram of a computer system for implementing embodiments of the invention.

FIG. 2 illustrates a computer system 200 in block diagram form, which may be representative of any of the clients and/or servers shown in FIG. 1, as well as, devices, and apparatus in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1 as well as devices and apparatus in other Figures. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the invention. It will be evident, however, to one of ordinary skill in the art that the invention may be practiced without these specific details. In some instances, well-known structures and devices are shown in block diagram form, rather than in detail, in order to avoid obscuring the invention. These embodiments are described in sufficient detail to enable those of ordinary skill in the art to practice the invention, and it is to be understood that other embodiments may be utilized and that logical, mechanical, electrical, and other changes may be made without departing from the scope of the invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the invention may be practiced as well as implemented as an embodiment).

An "event" is understood by one skilled in the art and may be defined as transmitting information to/from one component to another, or for one component to call a method on another component. Upon reception an event may generates a state change in the receiving component, which by itself may change operation, program flow, etc. (for example, how a posting, filtering, aggregation, error, etc. should be handled).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for associating network devices have been described.

What is claimed is:

1. A method comprising:
    registering a plurality of entities, said entities being devices and services;
    receiving an event from one or more of said plurality of entities;
    creating context operational modifiers selected from the group consisting of context rules, context definitions, context services, and any combination of context rules and context definitions and context services; and
    communicating said event to any of said plurality of entities based upon said context operational modifiers.

2. The method of claim 1 wherein said entities are selected from the group consisting of devices, services, and devices and services.

3. The method of claim 2 wherein said plurality of devices are selected from the group consisting of user operable devices, devices running applications to support said plurality of devices, client devices, application server devices, and server devices.

4. The method of claim 1 wherein registering further comprises:
    creating a context entry for any registering entity of said plurality of entities; and
    creating an observer of said context entry.

5. The method of claim 4 further comprising adding said observer of said context entry to a list of observers.

6. The method of claim 1 wherein registering is temporally disparate with respect to said plurality of entities.

7. The method of claim 1 further comprising an operation selected from the group consisting of adding an entry, removing an entry, generating a new event, generating a response, passing said event, passing a response, redistributing said event, redistributing a response, responding to said event, indexing said event, indexing a response, indexing an event response, tracking said event, tracking a response, aggregating events, aggregating responses, filtering events, filtering responses, synchronizing events, synchronizing responses, posting events, posting responses, generating an error, and generating an alarm.

8. The method of claim 7 wherein said operation is modified by said context operational modifiers.

9. A non-transitory machine-readable medium having stored thereon instructions, which when executed performs the method of claim 1.

10. A system comprising a processor coupled to a memory, which when executing a set of instructions performs the method of claim 1.

11. The method of claim 1 further comprising communicating a payment and/or credit.

12. A method for creating m-devices to n-services associations, the method comprising:
    registering said m-devices;
    registering said n-services;
    creating context operational modifiers selected from the group consisting of context rules, context definitions, context services, and any combination of context rules and context definitions and context services; and
    communicating to any of said m-devices or any of n-services based upon said context operational modifiers.

13. The method of claim 12 wherein registering further comprises:
    adding entries; and
    adding observers for said entries.

14. The method of claim 12 wherein said context rules and context definitions define operations selected from the group consisting of adding entries, removing entries, passing events, generating responses, indexing, tracking, redistributing, sending, receiving, aggregating, filtering, synchronizing, posting, and generating error messages.

15. A non-transitory machine-readable medium having stored thereon instructions, which when executed performs the method of claim 12.

16. An apparatus for creating m-devices to n-services associations, the apparatus comprising:
    means for registering said m-devices;
    means for registering said n-services;

means for creating context operational modifiers selected from the group consisting of context rules, context definitions, context services, and any combination of context rules and context definitions and context services; and means for communicating to any of said m-devices or any of n-services based upon said context operational modifiers.

17. The apparatus of claim 16 further comprising means for communicating a payment and/or credit.

18. A non-transitory machine-readable medium having stored thereon information representing the apparatus of claim 16.

* * * * *